United States Patent
Davis et al.

(10) Patent No.: US 7,175,054 B2
(45) Date of Patent: Feb. 13, 2007

(54) METHOD AND APPARATUS FOR DISINFECTING A REFRIGERATED WATER COOLER RESERVOIR

(75) Inventors: Kenneth A. Davis, Mandeville, LA (US); James J. Shelton, Alpine, TX (US)

(73) Assignee: S.I.P. Technologies, LLC, Centreville, DE (US)

( * ) Notice: Subject to any disclaimer, the term of this patent is extended or adjusted under 35 U.S.C. 154(b) by 518 days.

(21) Appl. No.: 09/996,328

(22) Filed: Nov. 28, 2001

(65) Prior Publication Data

US 2006/0191960 A1 Aug. 31, 2006

Related U.S. Application Data

(63) Continuation-in-part of application No. 09/954,849, filed on Sep. 18, 2001, now Pat. No. 6,532,760, which is a continuation-in-part of application No. 09/881,796, filed on Jun. 15, 2001, now Pat. No. 6,561,382, which is a continuation of application No. 09/472,320, filed on Dec. 23, 1999, now Pat. No. 6,289,690, which is a continuation-in-part of application No. 09/220,554, filed on Dec. 23, 1998, now Pat. No. 6,085,540.

(51) Int. Cl.
B67D 5/58 (2006.01)

(52) U.S. Cl. .................. 222/190; 222/146.6; 210/139; 62/389

(58) Field of Classification Search ................ 222/190, 222/129.1, 146.6; 62/389; 210/139
See application file for complete search history.

(56) References Cited

U.S. PATENT DOCUMENTS

| | | | |
|---|---|---|---|
| 1,403,025 A | 1/1922 | Haase | |
| 2,093,619 A | 9/1937 | Powell | 204/32 |
| 2,947,525 A | 8/1960 | Klein | |
| 3,448,045 A | 6/1969 | Hess et al. | 210/63 |
| 3,692,180 A | 9/1972 | Laraus | 210/139 |
| 3,726,404 A | 4/1973 | Troglione | 210/139 |
| 3,967,131 A | 6/1976 | Slipiec | 250/539 |
| 3,970,731 A | 7/1976 | Oksman | |
| 4,019,986 A | 4/1977 | Burris et al. | 210/139 |
| 4,035,657 A | 7/1977 | Carlson | 250/533 |
| 4,410,495 A | 10/1983 | Bassler | 422/186 |

(Continued)

FOREIGN PATENT DOCUMENTS

| | | |
|---|---|---|
| EP | 0 163 750 | 6/1984 |
| EP | 0 739 312 B1 | 1/1999 |
| GB | 2 022 979 A | 3/1997 |
| JP | 361103595 | 5/1986 |
| WO | WO/88/04279 | 6/1987 |
| WO | WO/92/04969 | 11/1991 |
| WO | WO 93/17725 | 3/1993 |
| WO | WO 97/42924 | 5/1997 |

*Primary Examiner*—Gene Mancene
*Assistant Examiner*—Melvin A Cartagena
(74) *Attorney, Agent, or Firm*—Garvey, Smith, Nehrbass & North, L.L.C.; Charles C. Garvey, Jr.

(57) ABSTRACT

A method and apparatus for providing sanitized water in a cabinet and spigot type bottled water dispenser features an ozone generating system to generate ozone for sanitizing the water. Ozone is generated and collected within an ozone generator housing. A blower transmits air to the ozone generator housing. The air carries the ozone that is generated through a flow line to an air diffuser that is positioned upstream of the spigot (or spigots) used to dispense water. In one embodiment, a valve that is activated on the spigot to dispense water also activates the blower and ozone generator. In other embodiments, a flow sensor activates the ozone generator and blower. Various spigot and flow sensor arrangements are disclosed as a part of the overall apparatus and method.

37 Claims, 14 Drawing Sheets

U.S. PATENT DOCUMENTS

| | | | |
|---|---|---|---|
| 4,764,349 A | 8/1988 | Arff | 422/186 |
| 4,776,127 A | 10/1988 | Jackson | |
| 4,842,723 A | 6/1989 | Parks et al. | 210/95 |
| 5,015,394 A | 5/1991 | McEllhenney et al. | 210/744 |
| 5,106,495 A | 4/1992 | Hughes | 210/139 |
| 5,213,773 A * | 5/1993 | Burris | 422/256 |
| 5,256,282 A | 10/1993 | Chang | |
| 5,295,519 A | 3/1994 | Baker et al. | 141/18 |
| 5,328,059 A | 7/1994 | Campbell | 222/189 |
| 5,366,619 A | 11/1994 | Matsui et al. | 210/139 |
| 5,503,809 A | 4/1996 | Coate | 422/186 |
| 5,531,908 A | 7/1996 | Matsumoto et al. | 210/760 |
| 5,567,332 A | 10/1996 | Mehta | 216/57 |
| 5,582,717 A | 12/1996 | Di Santo | 210/86 |
| 5,587,089 A | 12/1996 | Vogel et al. | 210/164 |
| 5,632,268 A | 5/1997 | Ellis | |
| 5,669,221 A | 9/1997 | LeBleu et al. | 62/92 |
| 5,698,164 A | 12/1997 | Kishioka | 422/121 |
| 5,871,701 A | 2/1999 | Long | 422/186 |
| 6,270,733 B1 | 8/2001 | Rodden | 422/186.07 |
| 6,289,690 B1 | 9/2001 | Davis | 62/392 |

\* cited by examiner

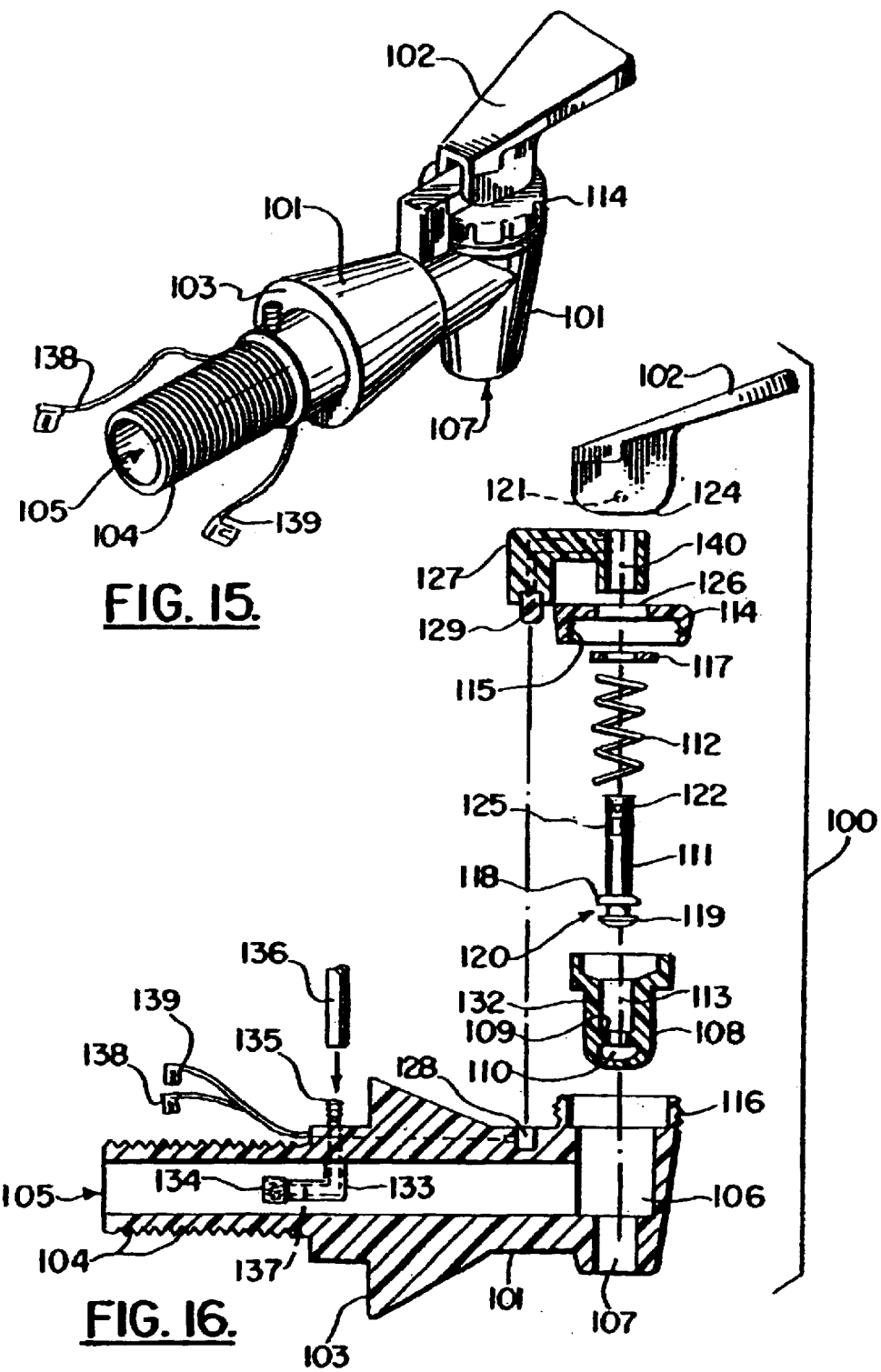

METHOD AND APPARATUS FOR DISINFECTING A REFRIGERATED WATER COOLER RESERVOIR

CROSS-REFERENCE TO RELATED APPLICATIONS

This is a continuation-in-part of U.S. patent application Ser. No. 09/881,796 filed Jun. 15, 2001 (now U.S. Pat. No. 6,561,382), and U.S. patent application Ser. No. 09/954,849, filed Sep. 18, 2001 (now U.S. Pat. No. 6,532,760), which is a continuation of U.S. patent application Ser. No. 09/472,320, filed Dec. 23, 1999 (now U.S. Pat. No. 6,289,690), which is a continuation-in-part of U.S. patent application Ser. No. 09/220,554, filed Dec. 23, 1998 (now U.S. Pat. No. 6,085,540), all hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to bottled water (preferably refrigerated) dispensers, and more particularly to an improved bottled water dispenser for dispensing water that has been sanitized using ozone and more particularly to an improved method and apparatus for sanitizing water that is to be dispensed from a water cooler of the type having a cabinet with one or more spigots that are manually operable to dispense water from a reservoir water supply that is hidden inside the cabinet.

2. General Background of the Invention

There are several types of cabinet type water dispensers in use today. One of the most common types of such water dispensers is a floor standing cabinet having an open top that receives a large inverted bottle. The bottle is typically of a plastic or glass material having a constricted neck. The bottle is turned upside down and placed on the top of the cabinet with the neck of the bottle extending into a water filled reservoir so that the water seeks its own level in the reservoir during use. As a user draws water from a spigot dispenser, the liquid level in the reservoir drops until it falls below the neck of the bottle at which time water flows from the bottle and bubbles enter the bottle until pressure has equalized. Inverted bottle type water dispensers are sold by a number of companies in the United States and elsewhere. Many are refrigerated.

Other types of water dispensers have an outer cabinet that contains a reservoir or water supply. These other types of water dispensers having a cabinet include one type that stores a large bottle (such as three or five gallon) at the bottom of the cabinet. A pump transfers water from the large bottle to the reservoir. At the reservoir, the water is typically refrigerated.

Another type of water dispenser simply connects a water supply directly to a reservoir that is hidden inside the cabinet. A float valve or other water level controller can be provided to insure that the reservoir is always filled with water but does not overflow. Water that is transferred from city water, well water or another source can be filtered or otherwise treated before being transmitted to the reservoir.

All of these types of water dispensers that employ cabinets typically have one or more water dispensing spigots on the outside of the cabinet. These spigots are typically manually operated.

One of the problems with cabinet style water dispensers is that of cleansing the reservoir from time to time. Because the reservoir is not air tight, it breathes so that bacteria can easily enter the reservoir over a period of time. The reservoirs are typically contained within the confines of the cabinet and are not easily accessed and cleaned by consumers or end users.

For inverted bottle type dispensers, in addition to the problem of an open top, the five gallon bottles are themselves a source of bacteria and germs. Most of these bottles are transported on trucks where the bottles are exposed to outside air. They are handled by operators that typically grab the bottle at the neck, the very part of the bottle that communicates with the open reservoir during use. Unfortunately, it is difficult to convince every person that handles these bottles to wash their hands frequently enough.

In order to properly sanitize such a water dispenser or cooler, the user must carefully clean the neck of the bottle prior to combining the bottle with the cabinet. Further, the user should drain and sanitize the reservoir from time to time. The cleansing of the reservoir in such a water dispenser is a time consuming project that is typically not performed at regular intervals.

The dispensing spigots that are provided on common cabinet type water dispensers can also be a source of contamination. These spigots are typically manually operated and are therefore a source of contamination from the user's that operate them. Very small children have also been known to drink directly from the spigot, probably because the spigot is located at a distance above the ground that closely matches the elevation of a child's mouth at an early age. Therefore, sanitation of the spigots as well as the reservoir should be a part of routine maintenance.

The present invention provides an improved self sanitizing water dispenser apparatus as well as a method for generating ozone for cleaning the reservoir and the water contained within it.

BRIEF SUMMARY OF THE INVENTION

The present invention provides a self sanitizing cabinet type water dispenser that includes a cabinet having upper and lower end portions, the upper end portion of the cabinet having a cover. The upper end portion can house a reservoir that receives water (eg. filtered) from a municipal water system, well, or from a contained bottle. An upper opening can be provided in some models for receiving and holding an inverted a bottle of water (eg. 3–5 gallon) to be dispensed. The bottle contains water to be dispensed, and provides a neck portion and a dispensing outlet portion.

A reservoir contained within the cabinet holds water to be cooled and dispensed. A refrigeration system cools the water within the reservoir. The reservoir can optionally be heated. A diffuser (eg. ring) emits bubbles into the reservoir, the diffuser being disposed within the reservoir at the lower end portion thereof and preferably next to the reservoir wall so that bubbles emitted by the diffuser help scrub the reservoir wall.

An ozone generator is supported within the housing. Flow lines communicate with an air pump to carry ozone from the ozone generator housing to the diffuser. A blower generates flow and a flow line connects the blower to the ozone generator housing. In the preferred embodiment, ozone can be transmitted to the reservoir or to a flow channel that is upstream of the water dispensing spigot(s).

The spigot is provided with a switch for activating the ozone generator for a selected time interval. The ozone generator is activated for a selected time interval (e.g. a few minutes). After the selected time interval, the ozone generator is shut off. The air pump continues air flow for a time period (eg. a few minutes) in order to help disperse any odor of ozone. The air pump is then shut off and the refrigeration system compressor starts operation again to cool the water.

The diffuser can be a ring shape, positioned around the side of the reservoir at the bottom of the reservoir. Such a ring diffuser can be positioned close to the intersection of the reservoir bottom wall and reservoir side wall.

The diffuser can be of a composite construction that includes a porous core that is partially covered with a non-porous coating.

The reservoir preferably has a center portion and the diffuser ring preferably has openings positioned to direct air away from the center portion of the reservoir.

The reservoir can include a generally vertical side wall. The diffuser can be positioned to discharge bubbles against the side wall so that the side wall is scrubbed with ozone bubbles during sanitizing of the reservoir.

The ozone generator housing can be comprised of an upper housing section, a lower housing section and a gasket positioned in between the upper and lower sections. An ozone generator is contained within the interior of the housing. Fittings on the housing enable air to flow into and out of the housing. A blower generates air flow to carry air into the ozone housing and from the ozone generator housing to the air diffuser. Optionally, a HEPA filter can be provided at the air intake removes airborne microorganisms.

The present invention provides a compact, brief, high intensity, automated ozonation cycle and water cooler sanitization system and an improved ozone generating "tube" (see FIGS. 30–35). The engineering function dictating compactness is the space constraint of the insulated upper reservoir chilling compartment of a typical cooler reservoir. The present invention provides a self-contained ozonator module for achieving the shortest possible delivery path of process ozone to an in-reservoir diffusion system for minimizing chemically unstable ozone degradation losses and for taking advantage of immediate proximity to the reservoir cooling coil's lower air temperature as opposed to that of the compressor compartment.

A final need for systems integration and compactness is unit component cost, simplicity and reliability. The present invention provides an apparatus that is simple, reliable, rugged, and cost effective, and displays the ability to deliver a low cost, concentrated stream of ozone to a diffusion system needed to repeatedly "spike ozonate" small, changing static volumes of water or to an on demand faucet dispensed water flow stream. With the present invention, contact-diffusion brevity is imperative in achieving levels of sanitization not previously possible by micro-ozonation systems and small UV sanitization systems alike. This level of ozone concentration from air fed mini-ozonators has not been available for water cooler sanitization in the past, being available only in bulky form requiring either chilled feed gas, bottled oxygen or LOX as feed gas.

The present invention provides high output mini- and micro-ozonators suitable for intermittent short cycle ozonation. In this manner, in addition to cooler sanitation, the dispensed water quality is assured of being sanitary for consumption at all times. The present invention provides a spigot/faucet configured with a microswitch connected to an ozonator power circuit causing circuit activation during the time interval that the microswitch remains depressed. Alternatively, a faucet can be configured so that if depressed several times repeatedly, it signals a timer/controller to activate an air pump and ozonator until released.

In another embodiment, a reservoir volume-pressure change float sensor or air or water borne differential pressure transducer can be mounted in the cooler reservoir can be used to cause the ozonator to remain in operation until pressure restabilizes after dispensing is terminated.

Ozone is supplied by an ozonator/pump to a faucet water channel by an ozone supply line to an additional diffuser located in the spigot water channel for injecting small quantities of diffused ozone into the flow stream for making and dispensing freshly ozonated water without fear of an ozone in air safety hazard. The safe and effective antiseptic properties of freshly ozonated water are known and offer a safe and effective means for sanitizing cooler exterior, drinking utensils or for neutralizing potential biohazards and hazardous organic chemical spills.

The present invention provides an energy efficient, low cost, intermittent repetitive reservoir and reservoir water spike treatment with a concentrated ozone cycle activated either by cooler compressor cycle or through timer/controller circuit with cooler compressor remaining in operation, brief ozonation time to bacteria-static levels followed by passive dissipation time interval, cycling continuously over a 24 hour daily period, and/or manual ozonator activation for dispensing freshly ozonated water, ozonated to non-taste, non-harmful, bacteria-static levels. In this fashion, no harmful bacteria is contained in the remaining bottled water or cooler reservoir or water dispensed from a municipal source fed point of use.

The present invention's higher outputs and alternative cycling has been demonstrated effective in mixing transfer of diffused ozone and resultant secondary peroxyl group residuals from cooler reservoir water to water contained in water bottle over time by standard indigo dye test where indigo dye is introduced into a cooler reservoir, a water bottle containing water is added, dye dissolves and transfers to a bottled water coloring the water blue. After an ozonation cycle is run, the diffused ozone mixing transfer to water bottle is observed when the oxidant sensitive dye degrades and water color returns to transparent.

These new features extend the water service industry's onsite automatic sanitization options to include not only cooler reservoir and bottled water sanitization, but to faucet watercourses and dispensed water as well. The same timer/controller circuit found on auto-cycling cooler sanitizers with sufficient micro-chip memory can be programmed to include both long cycle compressor disconnect, ice ring melting, ozonation to antiseptic conditions, subsequent dissipation, compressor reconnect and intermittent repetitive bacteria-static cycle cooler sanitization cycles as well as the manual override activated freshly ozonated, dispensed water function.

Where only an intermittent spike ozonation cycle is required, the timer circuit in some cases may be eliminated and a more simple, cost effective ozonator-pump-diffuser set-up can be installed on a cooler by power circuit attachment to the cooler compressor so that pump and ozonator cycle with the cooling cycle.

In the event a compressor cycle is longer than needed for achieving antiseptic conditions, the above set-up may require a simplified programmable timer/controller circuit that allows for start-up with the compressor, but shuts off after a bacteria-static diffused ozone level cycle width has occurred. The cycles that are available with the present invention were not formerly possible or provided for by prior art examples of retrofitted or integral auto-cycling water cooler air-fed micro-ozonator due to their inability to achieve ozone concentrations and diffusion transfer needed to "spike ozonate" a standard cooler's static two (2) liter volume maximum of water much less that of larger volume coolers exceeding 1 gallon reservoir volumes or small dispensing flow stream's flow rate maximum of 2 l/min to at least bacteria-static levels under the imposed time constraints.

The ozone concentration required to spike ozonate water with the proper diffusion technology operating at low pressure is 3–4 times the output of the highest output prior art micro-ozonators known to applicant, meaning a micro-ozonator capable of continuously delivering 600–800 mg/hr ozone concentration in air coupled to a state of the art low bubble pressure, micro-porous, hydrophobic ceramic material diffuser (preferably of a ring shape) mounted on the cooler reservoir bottom like that disclosed in prior U.S. Pat. No. 6,289,690. The desired ozone output has been accomplished by simple substitution of this discharge tube embodiment for prior art in said prior art's power circuit contained within its existing case.

The intermittent repetitive cycle widths for a cooler micro-ozonator system activated by timer/controller circuit can be based effectively on how different water species respond to ozone. Acidic water species are easy to ozonate, but require more time for diffused ozone to dissipate from the water to below taste levels, whereas basic or alkaline water species resist ozonation and will not hold diffused ozone for any length of time at any given water temperature.

Ideally, for a given cooler reservoir water temperature average of 40 F., the intermittent, repetitive cycle ozonation cycle should be based on the length of time it takes to spike ozonate a pH9 water volume to bacteria-static levels with a dissipation time equal to that requiring pH 5.2 distilled water to be free of dissolved ozone content in order to accommodate all water species using a single pre-programmed timer cycle.

An additional factor of concern related to spike ozonation cycles is the presence of bromine in source waters. Ozonation above certain levels of diffused ozone in water converts bromine and certain bromine compounds to bromate, a suspected carcinogen. FDA Safe Drinking Water Act regulations have recently been amended to include a maximum contaminant level for bromate in drinking water of 10 mg/l, possible decreasing to 5 mg/l within a year. Ozone oxidation of bromine to bromates is a function of ozone concentration, exposure time, temperature and water pH.

The various solute bearing water species at risk for oxidative conversion of bromine to bromate range in pH from 1–7, more specifically fresh and processed water supplies of pH 5–7, the range from distilled water through pH neutral mineral bearing water sources commonly used in bottled product. Thus spike ozonation may be the only safe, effective and cost effective means for controlling bromate production in water undergoing ozonation while achieving adequate levels of disinfection and/or sanitization. Luckily, cooler water temperatures are low enough to alleviate some of the potential difficulty. Water briefly spiked with ozone, held at levels below the diffused ozone concentration threshold for bromate production over brief intervals will result in minimal production of bromates in waters containing elevated levels of bromine and its compounds.

Spike ozonation can also be accomplished without a timer/controller by altering a cooler's compressor cycles to correspond to these timed cycles provided the alteration does not adversely effect a cooler's ability to operate within its chill water volume design parameters. If water remains in a cooler reservoir unused over repeated cycles, the bacteria-static oxidation level will move to a bactericidal oxidation state, as more of the static biophage is rendered non-living and inert.

The present invention provides an improved coronal discharge tube arrangement. Whereas a prior art 200 mg/hr ozonator is capable of achieving bacteria-static diffused ozone levels in 1–2 liters of water in 20 minutes with proper diffusion technology that may better approximate a cooler chill cycle and offer better ozone dissipation time through reduced diffused ozone quantity present in water, said ozonator is incapable of spike ozonating a flow stream of water dispensing from a cooler to any degree at all to form a multi-function water cooler ozonation system or a system capable of spike ozonating cooler reservoir water volumes to like bacteria-static levels in under 5 minutes operating time and allowing the remaining 15 minutes to be spent dissipating the ozone to below taste levels.

The shorter the cycle widths, the greater the surety of sanitized cooler and water. Additionally, said smaller output mini-ozonators cannot effectively sanitize larger reservoir volume coolers of the type whose water volumes exceeds one or more gallons in a timely fashion. Poorly thought out and engineered past attempts at ozone sanitizing water coolers include methods such as continuous ozonation of water using low output small ozonators. This effort has a threefold disadvantage. First the continuous introduction of ozonated ambient air causes an added energy debt to a compressor having to run all the time to cool the water, thus effectively shortening compressor, ozonator and pump life. Secondly, the continuous introduction of dust, organics and micro-organisms found in air shortens discharge tube life and unnecessarily introduces pollutants into the reservoir and contained water, thus increasing oxidation load and rendering the water potentially non-potable. If the discharge tube fails by overheating caused by dust and/or moisture build-up on an electrode or the dielectric, the system continuously introduces an unoxidized, unsanitary load into the cooler reservoir or builds up in the discharge tube to the point that the resulting blockage causes pump failure. This is one reason why this embodiment offers an inexpensive, quick-change throwaway, sanitary discharge tube option that is far below the cost of the lest expensive UV sanitization system replacement tube requiring more frequent replacement. Thirdly, ozonators specified for this purpose frequently have too small an output to oxidize the load found in water where the small quantity of diffused ozone either dissipates or does not have time to build to adequate levels to perform its function when coolers are subject to heavy use.

In addition to air dielectric breakdown leading to ionization, ozone generation by the coronal discharge method generates light and heat. A portion of said light lies in the far ultra-violet ionizing radiation spectrum and is responsible for cleaving the diatomic oxygen molecular bond. This preparatory bond cleaving is necessary for ozone formation. Such far UV ionizing radiation light fraction can be conserved and recycled by reflection. When a cylindrical mirrored reflecting surface is employed, a dramatic increase in oxygen to ozone conversion efficiency is noted over prior art.

BRIEF DESCRIPTION OF THE DRAWINGS

For a further understanding of the nature, objects, and advantages of the present invention, reference should be made to the following detailed description, read in conjunction with the following drawings, wherein like reference numerals denote like elements and wherein:

FIG. 15 is a partial perspective view of a second embodiment of the apparatus of the present invention;

FIG. 16 is a partial sectional elevation view of the alternate embodiment of the apparatus of the present invention;

DETAILED DESCRIPTION OF THE INVENTION

Figure 1:
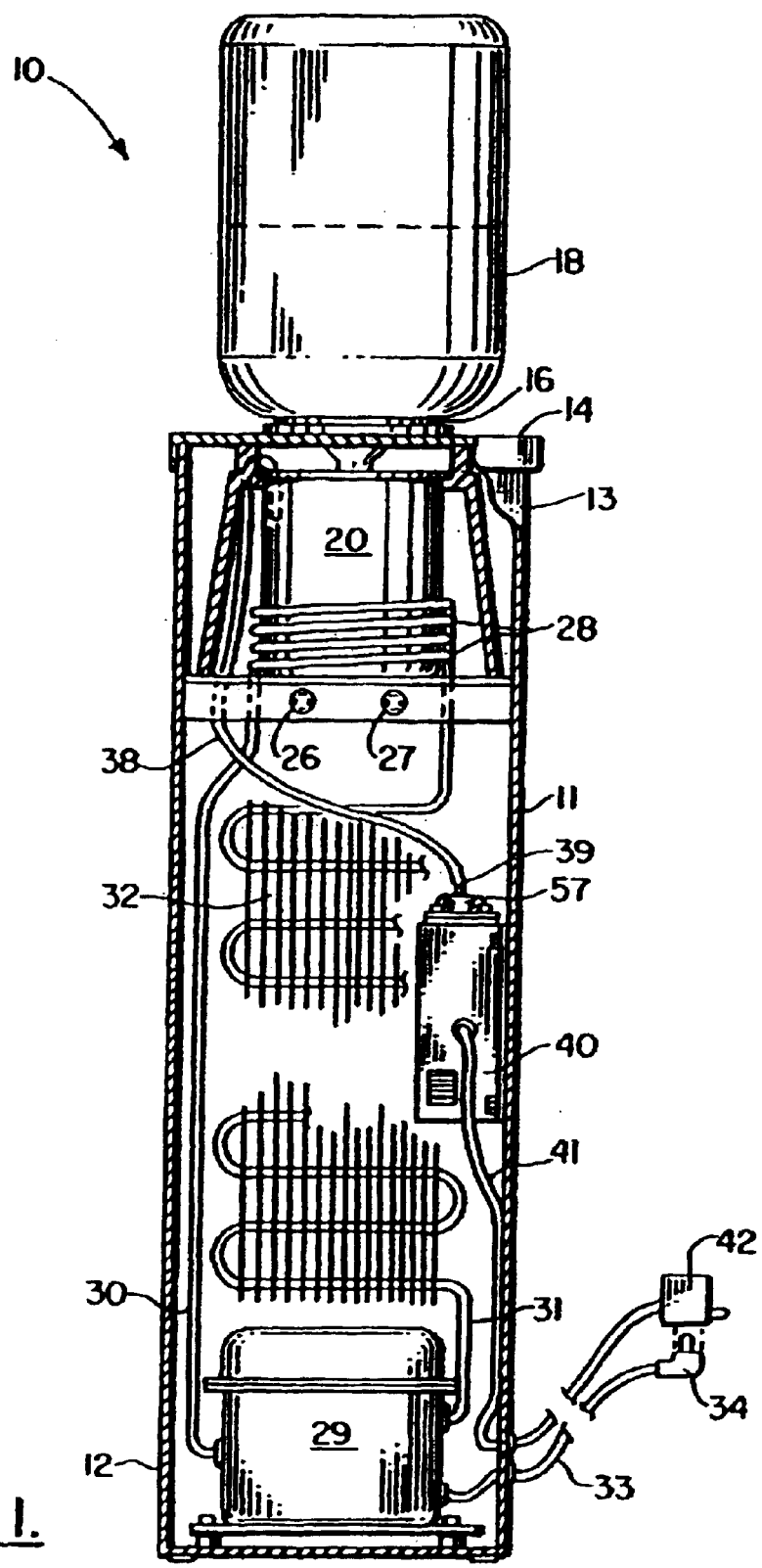
FIG. 1 is a sectional elevational view of the preferred embodiment of the apparatus of the present invention.
Figure 2:
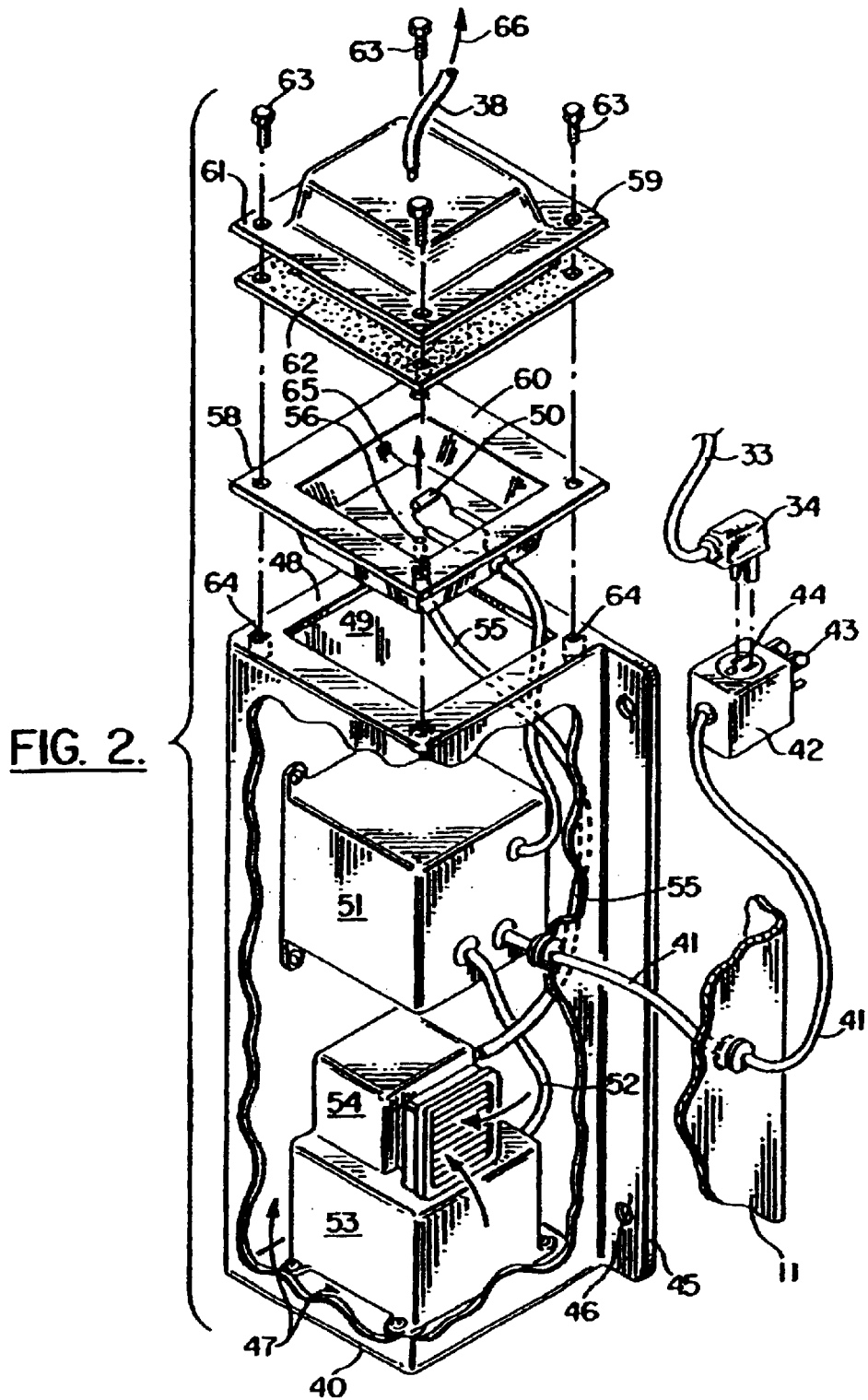
FIG. 2 is a partial perspective exploded view of the preferred embodiment of the apparatus of the present invention illustrating the ozone generator portion thereof.
Figure 3:
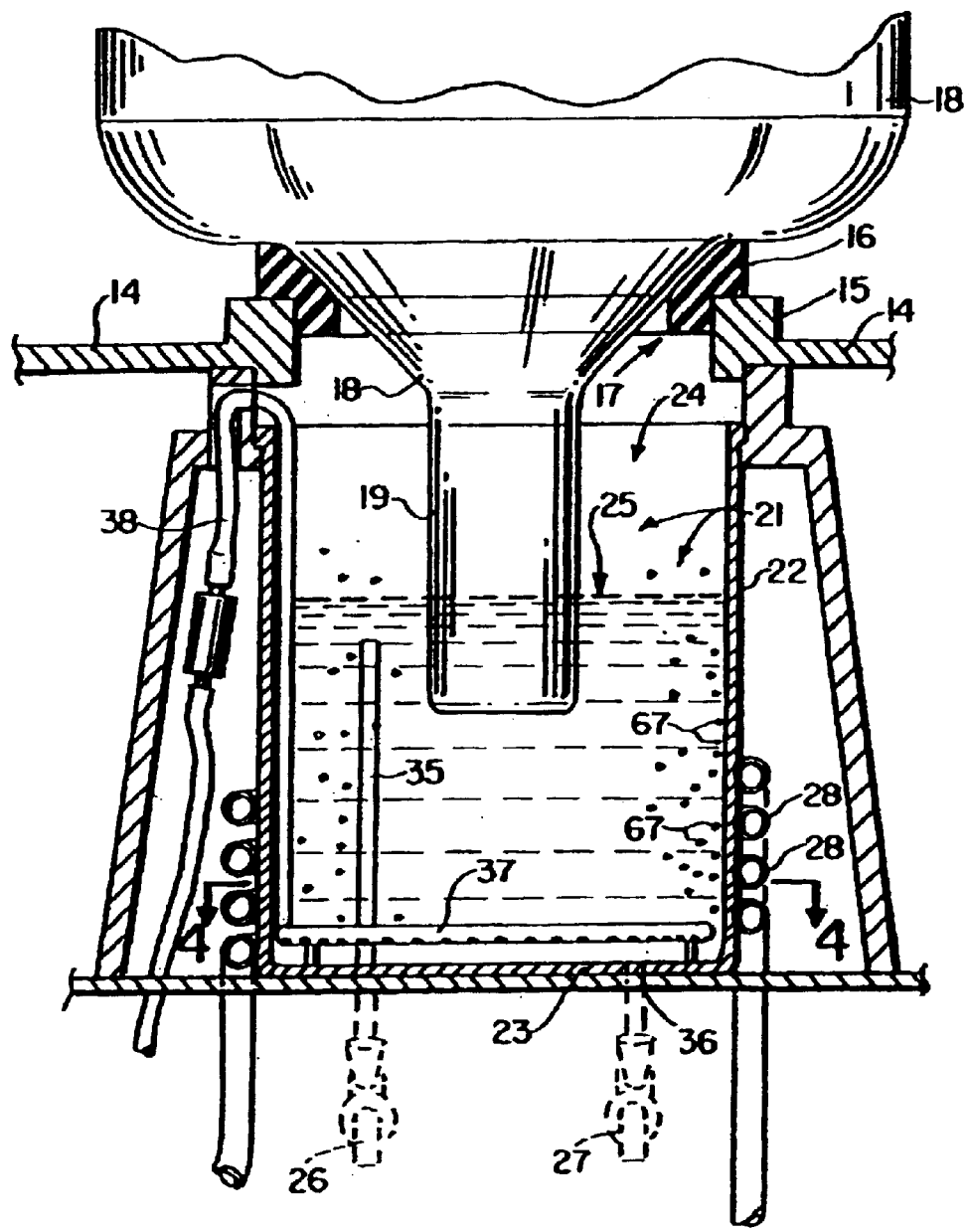
FIG. 3 is a partial sectional elevational view of the preferred embodiment of the apparatus of the present invention illustrating the reservoir, bottle, and ozone diffuser portions thereof.

FIGS. 1–3 show generally the preferred embodiment of the apparatus of the present invention designated by the numeral 10 in FIG. 1. Water dispenser 10 provides an improved apparatus that sanitizes the open reservoir from time to time with ozone. The apparatus 10 includes a cabinet 11 having a lower end portion 12 and an upper end portion 13. The upper end portion 13 carries a cover 14 having an opening 17.

The opening 17 provides an annular flange 15 and a gasket 16 that defines an interface with bottle 18. The bottle 18 is a commercially available bottle that is typically of a several gallon volume (e.g. five gallons) in the United States. The bottle 18 provides a constricted bottled neck 19 that is placed inside an open reservoir 20 as shown in FIGS. 1 and 3 during use. The bottle neck 19 has an opening for communicating with a reservoir 20 at the interior of the cabinet 11 that holds the water product to be dispensed and consumed. When the reservoir 21 is lowered during use, air bubbles enter the bottle and water replenishes the reservoir 20 until pressure equalizes.

The reservoir 20 has an interior 21 surrounded by reservoir sidewall 22 and reservoir bottom wall 23. The reservoir can be, for example, generally cylindrically shaped and of a stainless steel or plastic material. The reservoir 20 provides an open top for communicating with the neck 19 of bottle 18.

During use, reservoir 20 has a water surface 25 that fluctuates slightly as water is dispensed and then replenished by bottle 18. One or more spigots 26, 27 can be provided for withdrawing water contained in reservoir 20. In the embodiment shown in FIG. 3, for example, a left hand spigot 26 has a flow line 35 that extends up to and near the surface 25 of water contained in reservoir 20. The spigot 26 thus removes ambient temperature water from reservoir 20 that is not in close proximity to the cooling coils 28. The spigot 27 provides a port 36 for communicating with water contained in reservoir 20. Because the refrigeration coils 28 are positioned at the lower end of reservoir 20, the spigot 26 withdraws cool water. As a practical matter, a water dispenser apparatus 10 could provide either ambient temperature water, cold water or heated water if, for example, a flow line 35 were to be provided with a heating element.

For cooling the water at the lower end portion of the reservoir 20, a cooling system that includes a compressor 29 can be provided. The refrigeration system includes flow lines 30, 31 in combination with compressor 29 to transmit cooling fluid to coils 28 and then to heat exchanger 32 as part of a system for cooling water in reservoir 20. Power to the apparatus 10 is provided by electrical lines, including an electrical line 33 provided with plug 34. The plug 34 can be fitted to controller 42 having receptacle 44 and plug 43 as shown in FIG. 2. In this fashion, electricity can be selectively routed to the compressor 29 via electrical line 33 or to the housing 40 containing ozone generator 50 using electrical line 41. This feature enables the compressor to be deactivated when the ozone generator 50 is to be used to transmit ozone to reservoir 20 for cleaning water contained in it and for scrubbing the inside walls of reservoir 20.

In FIGS. 1 and 2, the housing 40 includes an ozone generator 50 that generates ozone for cleaning water contained in reservoir 20. Additionally, the housing 40 contains a motor drive 53 and blower 54 that move air through an ozone generator housing 57 to diffuser 37. Air line 38 communicates between ozone generator housing 57 and ozone diffuser 37. Fitting 39 provides a connection for attaching the exit air flow line 38 to ozone generator 57 as shown in FIGS. 1 and 2.

Housing 40 can be provided with flanges 45 and openings 46 for enabling the housing 40 to be retrofitted to an existing cabinet 11 by bolting the housing 40 to the cabinet 11 as shown in FIG. 1.

In FIG. 2, housing 40 includes a lower end portion 47 and an upper end portion 48. The upper end portion 48 provides an opening 49 to which ozone generator housing 57 can be affixed. An ozone generator 50 is contained within the housing 57 as shown in FIG. 2. Housing 57 includes a lower housing section 58 and an upper housing section 59. Flange 60 of lower housing section 58 and flange 61 of upper housing section 59 each engage gasket 62 upon assembly.

Bolted connections 63 can be used for attaching the housing 57 to housing 40 at internally threaded openings 64 on housing 40 as shown in FIGS. 1 and 2. During use, the controller 42 normally deactivates the ozone generator 50 during normal hours when the users are dispensing water from the apparatus 10. Because the ozone used to disinfect reservoir 20 has a distinctive smell, it is preferable to clean the water contained in reservoir 20, to clean the inside walls of reservoir 20 and the bottle neck 19, at a selected time. The controller 42 could be activated for example during early morning hours (e.g. 3:00 a.m.–4:00 a.m.) and can be a commercially available controller that activates transformer 51 and motor drive 53 only after compressor 29 and the refrigeration system have been deactivated by the controller 42. This accomplished by shutting off the flow of electricity to plug 34 and electric line 33 that supply electricity to compressor 29.

Figure 4:
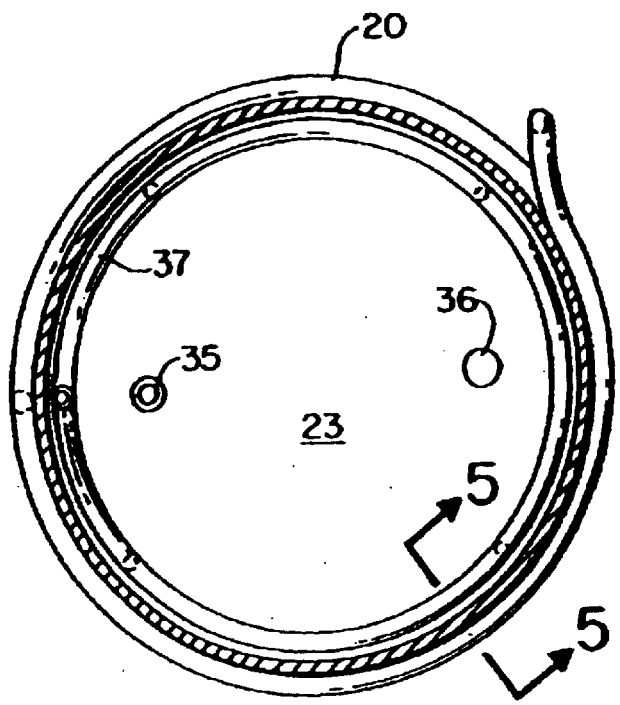
FIG. 4 is a fragmentary view of the preferred embodiment of the apparatus of the present invention illustrating the open reservoir and ozone diffuser.

After electricity is disconnected from compressor 29, transformer 51 and motor drive 53 are activated. The transformer 51 produces electricity with a very high voltage at ozone generator 50 for generating ozone within the confines of ozone generator housing 57. As this ozone is generated within housing 57, air is pumped with air pump 54 into inlet flow line 55 and via opening 56 into the interior of housing 57. HEPA filter 71 removes airborne microorganism before they can enter air pump 54 and flow line 55. This positive flow of air pressure into housing 57 causes a simultaneous discharge of air through fitting 39 into air flow line 38. The air flow line 38 then carries air to diffuser 37 or 37A (FIGS. 7–14) that is contained at the bottom at the side wall of reservoir 20. The specific placement of diffuser 37 or 37A and the flow of air therefrom containing ozone is shown more particularly in FIGS. 4–14. In FIG. 4, a top view of the reservoir shows that the diffuser 37 or 37A preferably extends 360 degrees about the periphery of reservoir 20 and at the sidewall 22 thereof. This is preferable because ozone bubbles 67 are used to scrub the side wall 22 at the inside surface as shown in FIG. 3.

Figure 6:
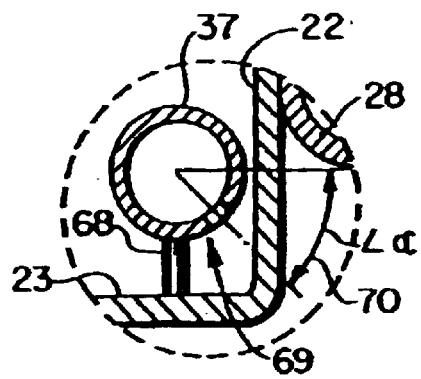
FIG. 6 is a fragmentary elevational view illustrating the ozone diffuser and its position in relation to the reservoir.
Figure 5:
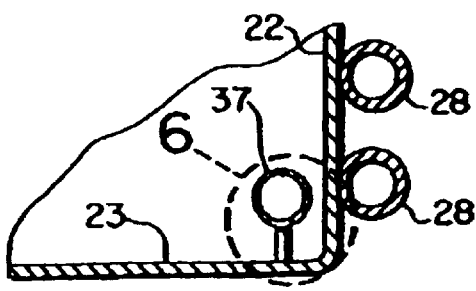
FIG. 5 is a sectional view taken along lines 5—5 of FIG. 4.

The diffuser 37 or 37A can be is supported by a plurality of feet 68 that extend between the diffuser 37 or 37A and a bottom wall 23 of reservoir 20. Openings 69 in diffuser 37 are directed at an angle with respect to the bottom wall 23 and side wall 22 of reservoir 20 as shown in FIG. 6. An angle 70 of preferably about 45 degrees defines the orientation of openings 69 with respect to the walls 22, 23. This configuration of the openings 69 relative to the walls 22, 23 ensures that bubbles 67 will be discharged outwardly toward side wall 22, to maximize the scrubbing effect at the interior wall 22 of reservoir 20. This scrubbing action using ozone bubbles 67 cleans the sidewall 22 and produces a rolling flow of water within reservoir 20. The bubbles 67 will strike the surface 25 of the reservoir 20 and flow inwardly. Such a circulation ensures that all of the water within the reservoir 20 is cleaned. Further, directing the bubbles from diffuser 37 outwardly toward wall 22 ensures that none of the bubbles 67 will enter bottle 18 via neck 19 which would cause the device to overflow.

Figure 7:
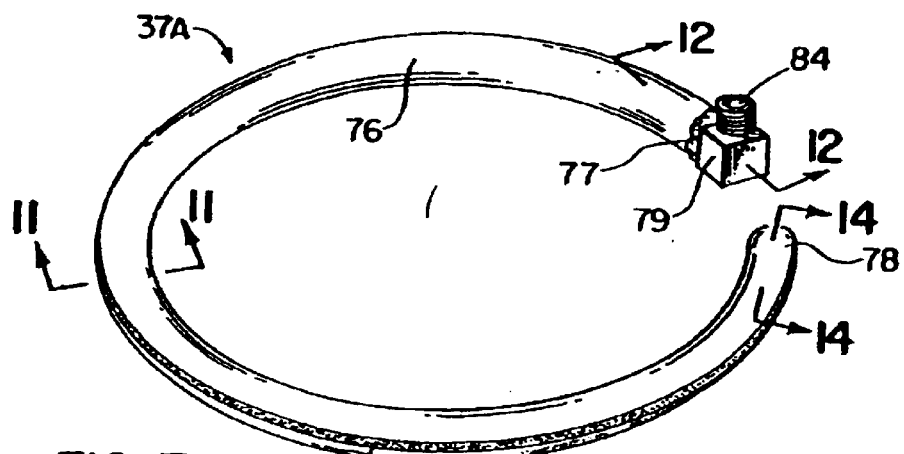
FIG. 7 is a fragmentary view of the preferred embodiment of the apparatus of the present invention illustrating an alternate construction for the diffuser.
Figures 8, 9, 10:
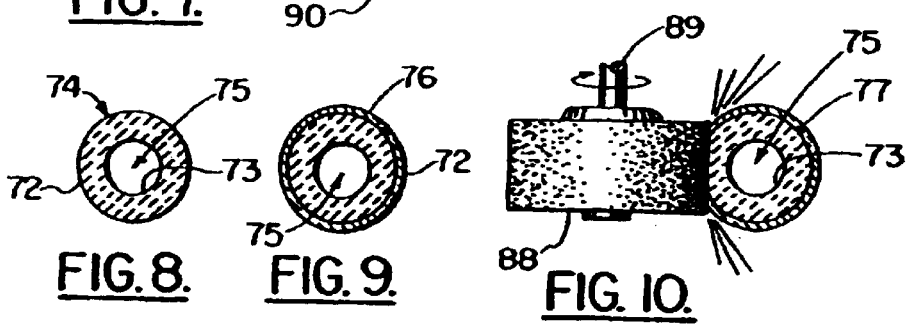
FIG. 8 is a fragmentary, sectional view of the diffuser of FIG. 7 showing the porous body portion thereof.
FIG. 9 is a fragmentary, sectional view of the diffuser of FIG. 7 prior to a grinding of part of the non-porous surface therefrom.
FIG. 10 is a schematic, fragmentary view illustrating the diffuser of FIG. 7 during construction.

FIGS. 7–14 show an alternate construction of the diffuser, wherein the diffuser is designated generally by the numeral 37A. Diffuser 37A has a porous body 72 as shown in FIG. 8 that begins with a cylindrically shaped hollow cross section. Porous body 72 can be a food grade porous ceramic material. The porous body 72 is generally C shaped as shown in FIG. 7, but provides the cross section shown in FIG. 11. FIGS. 8, 9 and 10 show the method of construction of the diffuser 37A which begins with porous body 72. In FIG. 8, porous body 72 has an inner surface 73 that surrounds hollow bore 75 and an outer surface 74. In FIG. 9, a non-porous coating (e.g. food grade non-porous epoxy that can e fired) is provided on porous body 72 to provide an outer coating 76 that is substantially impervious to the escape of air. In FIG. 10, rotary grinding tool 88 having rotary shaft 89 is used to grind away part of the non-porous coating 76 to provide an exposed face 90 (see FIGS. 10 and 11).

Figure 11:
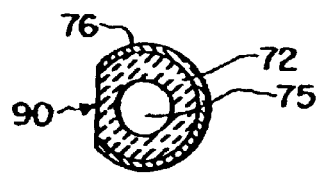
FIG. 11 is a sectional view taken along lines 11—11 of FIG. 7.
Figure 13:
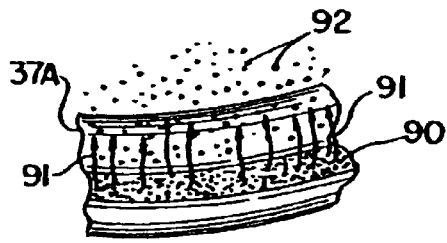
FIG. 13 is a fragmentary, perspective view illustrating the diffuser of FIG. 7.

When air is injected through inlet elbow fitting 79, the air enters hollow bore 75 and then diffuses through porous body 72. Coating 76 prevents the escape of air so that air can only escape through exposed face 90. Exposed face 90 is positioned on the outer portion of C shaped diffuser 37A as shown in FIGS. 7 and 11. An enlarged view of this exposed face 90 is shown in FIG. 13 with arrows 91 indicating the escape of bubbles 92.

Figure 12:
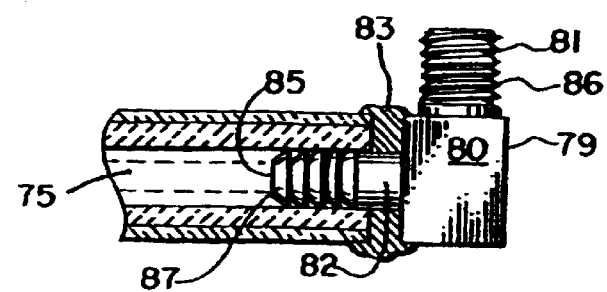
FIG. 12 is a sectional view taken along lines 12—12 of FIG. 7.

The inlet elbow fitting 79 has a body 80 with two legs 81, 82 extending therefrom. Coupling material 83 such as food grade epoxy can be used to join the combination of porous body 72 and its coating 76 to inlet elbow fitting 79. Each of the legs 81, 82 provides an internal hollow flow bore, said bores 84 and 85 intersecting at body 80 so that air flow can proceed from bore 84 of leg 81 to bore 85 of leg 82. The leg 81 can provide external threads 86 so that it can be connected to an influent air flow line 38. Other connectors could be used on leg 81 such as a stab fitting type connection, clamp connection or the like. Elbow fitting 79 at leg 82 can provide similar connective material for forming a connection with porous body 72 at its inner surface 73. This connective structure on leg 82 can be a stab fitting type connection as shown in FIG. 12, external threads, or like connective structure.

Figure 14:
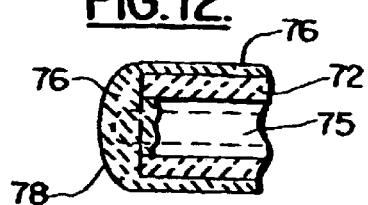
FIG. 14 is a sectional view taken along lines 14—14 of FIG. 7.

In FIG. 7, the diffuser 37A has closed end portion 78 and end portion 79 that receives elbow fitting 79. Closed end 78 can be closed by using the same material that constitutes coating 76 as shown in FIG. 14.

FIGS. 15–27 show an alternate embodiment of the apparatus of the present invention. The alternate embodiment provides a manually operable dispensing spigot 100 with a special switch arrangement that automatically activates an ozone generator such as the generator shown and described with respect to the preferred embodiment of FIGS. 1–14. It should be understood that the alternate embodiment of FIGS. 15–18 includes the spigot 100 as well as a cabinet 11, reservoir 20, and the various flow lines of the embodiments of FIGS. 1–14. In other words, in the alternate embodiment, spigot 100 replaces spigots 26, 27 of FIGS. 1–14. The spigot 100 triggers ozone generation and the transmission of ozone to the water contained within the reservoir. Ozone is also transmitted to a channel that connects the reservoir to the spigot, disinfecting water to be consumed.

In FIGS. 15–18, spigot 100 includes a spigot housing 101 to which is attached a handle 102 that enables a user to activate the handle 102 during the dispensing of water from the spigot 100.

Figure 18:
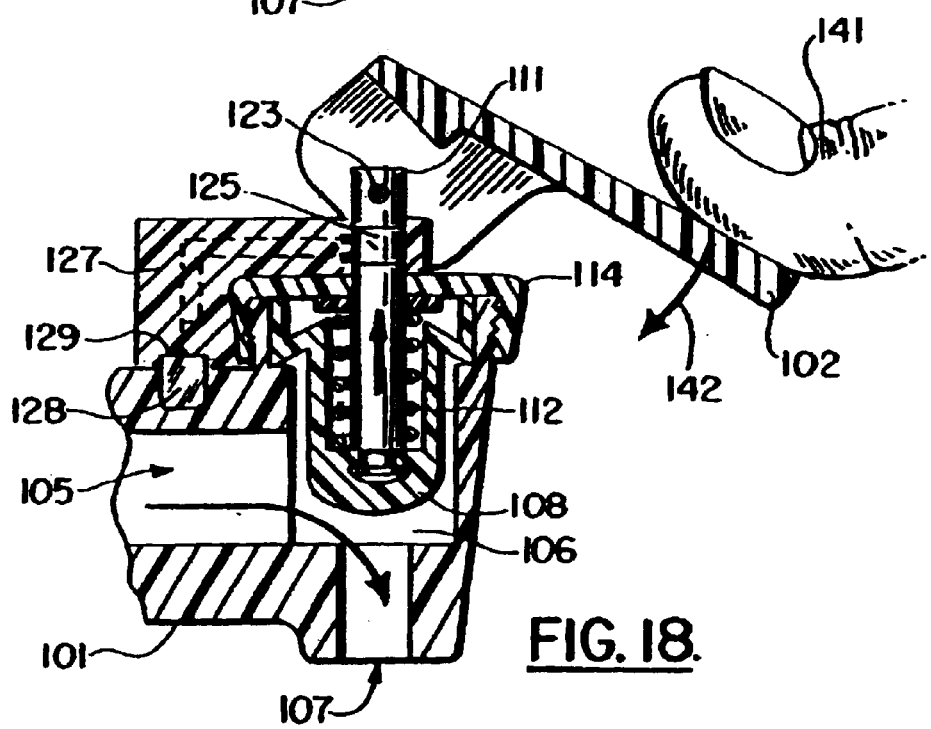
FIG. 18 is a partial sectional elevation view of the alternate embodiment of the apparatus of the present invention showing the spigot and valve in an opened position.

When the user 141 depresses the handle 102 to a dispensing, open valve position as shown in FIG. 18, not only is water dispensed into a container that the user is holding, but ozone is generated to sanitize an influent channel or horizontal bore 105 that communicates with flow outlet 107. The dispensing of ozone to horizontal bore 105 is in a very small concentration that is sufficient to disinfect water being dispensed, but not to generate an undesirable smell or taste.

Spigot 100 provides housing 101 that has an annular flange 103 that can engage the front surface of a cabinet such as the cabinet 11 that is shown and described with respect to the preferred embodiment of FIGS. 1–14. Flange 103 acts as a stop for the housing 101 after it is inserted at threaded portion 104 through an opening formed in the front surface of the cabinet 11. Threaded portion 104 enables a nut or other fastener to be threadably attached to the externally threaded section 104 for holding the spigot housing 101 to an opening in the front of the cabinet 11.

Water that is being dispensed from a reservoir of the cabinet 11 flows through a reservoir or flow channel that connects with horizontal bore 105. Vertical bore 106 extends from horizontal bore 105 to flow outlet 107.

Figure 17:
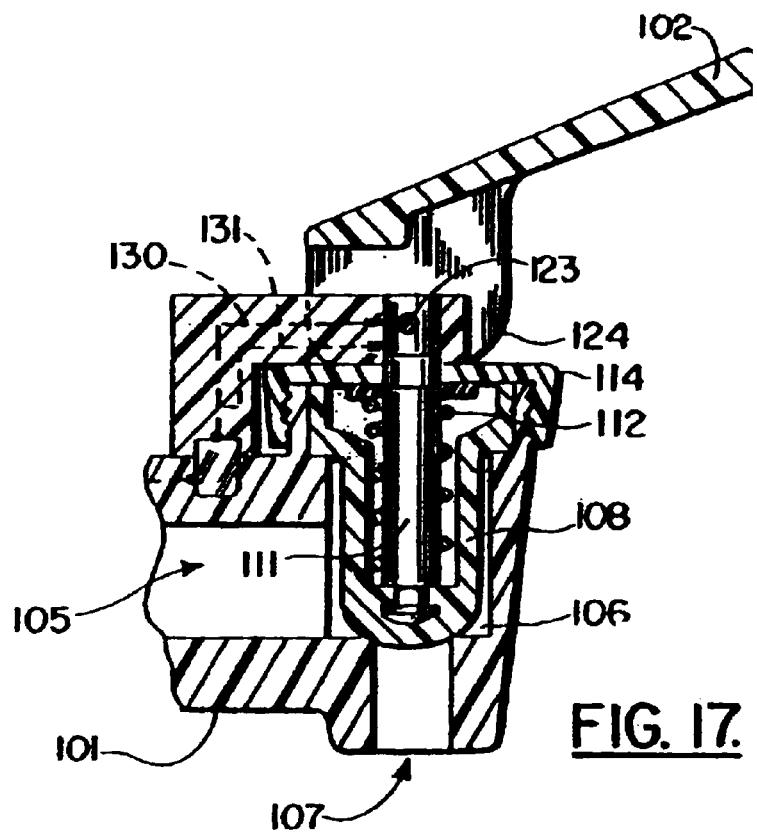
FIG. 17 is a partial sectional elevation view of the alternate embodiment of the apparatus of the present invention showing the spigot and valve in a closed position.

A valve body 108 is provided for opening and closing the flow outlet 107 as shown by the drawings in FIGS. 17 and 18. In FIG. 17, the flow outlet is closed. In FIG. 18, the flow outlet 107 is opened so that water can be dispensed. Valve body 108 (see FIG. 16) has an annular shoulder 109 and an operating rod socket 110. Operating rod 111 has an annular flange 119 that occupies socket 110 during use as shown in FIGS. 17 and 18. The operating rod 111 has an annular grove 120 that is provided in between a lower annular flange 119 and an upper annular flange 118. Basically, the annular shoulder 109 occupies annular groove 120 upon assembly.

Return spring 112 insures that the valve 108 will always return to a closed position when a user 141 is not depressing the handle 102. Rod 111 occupies socket 113 of valve body 108. A waterproof seal 132 is provided at the upper end portion of valve body 108 waterproof seal 132 engages cap 114 forming a water tight seal therewith.

Internal threads 115 of cap 114 engage external threads 116 on valve housing 101. Retainer 117 is provided for forming an attachment between cap 114 and dual contact barrel 127. A central opening 126 in cap 114 allows operating rod 111 to pass through cap 114. Similarly, a vertical, generally cylindrically shaped passageway 140 is provided on dual contact barrel 127 enabling operating rod 111 to pass through it. The upper end portion of operating rod 111 provides a transverse opening 122 that can align with the transverse opening 121 on handle 102. A pin 123 forms a connection between handle 102 at opening 121 and operating rod 111 at opening 122 as shown in FIGS. 16–18.

Handle 102 provides a cam surface 124 that lifts operating rod 111 when the handle 102 is pushed downwardly by a user 141 as illustrated in FIG. 107 by arrow 142. A metallic collar 125 is provided at the upper end portion of operating rod 111 as shown in FIG. 16. The collar 125 is part of a switch arrangement for activating the ozone generator when the handle 102 is depressed to the position shown in FIG. 18. The collar 125 contacts electrical lines 130, 131 of dual contact barrel 127. The metallic collar 125 closes a circuit to activate an ozone generator and blower when it contacts both of the electrical lines 130, 131 as seen in FIG. 18.

A receptacle 128 on valve housing 101 receives plug 129 of dual contact barrel 127. Electrical lines 138, 139 on valve body 101 communicate with socket 128 and thus plug 129 as shown in FIG. 18. Electrical lines 138, 139 are connected to the ozone generator and blower that are shown and described with respect to the preferred embodiment of FIGS. 1–14. When the handle 102 is depressed to the position shown in FIG. 18, the ozone generator and air pump are simultaneously activated so that ozone flows in flow tube 136 to ozone supply fitting 133 that is positioned in horizontal bore 105 of housing 101. Alternatively, the ozone generator and air pump can be activated by a timer that is activated when handle 102 is depressed. The ozone supply fitting 133 has a bore 137 and diffuser 134 that dispensing ozone to water that is contained in the bore 105. A barbed connector 135 can be provided for enabling a connection to be made between tubing 136 that supplies ozone and fitting 133.

Figure 19:
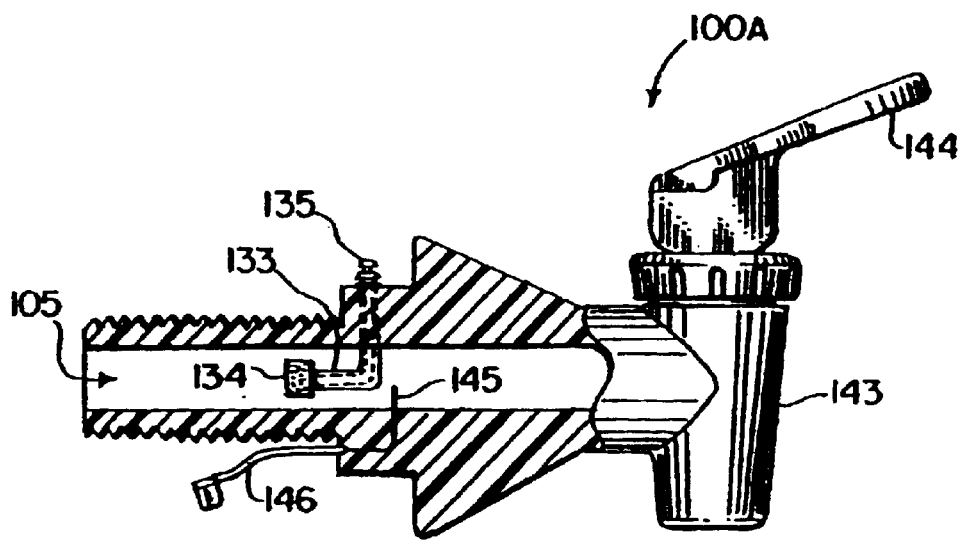
FIG. 19 is a partial, cut away, elevation view of the alternate embodiment of the apparatus of the present invention illustrating the spigot with a flow meter switch.
Figure 20:
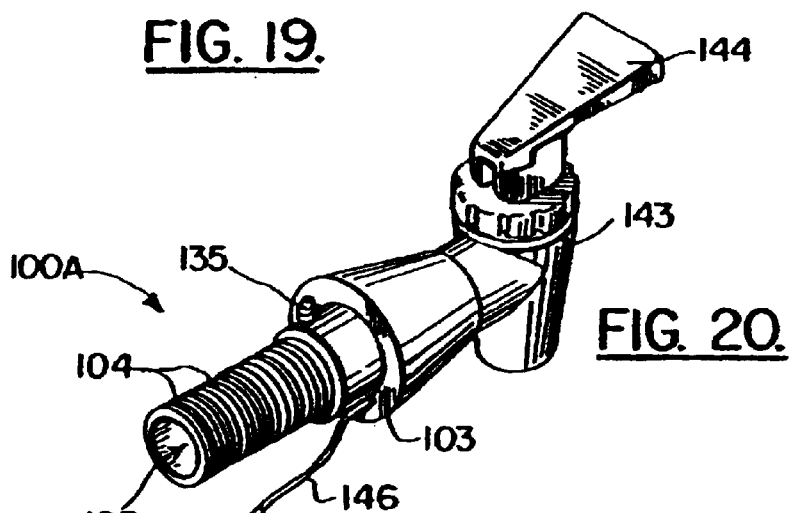
FIG. 20 is a partial perspective view of the alternate embodiment of the apparatus of the present invention illustrating the spigot of FIG. 19.
Figure 21:
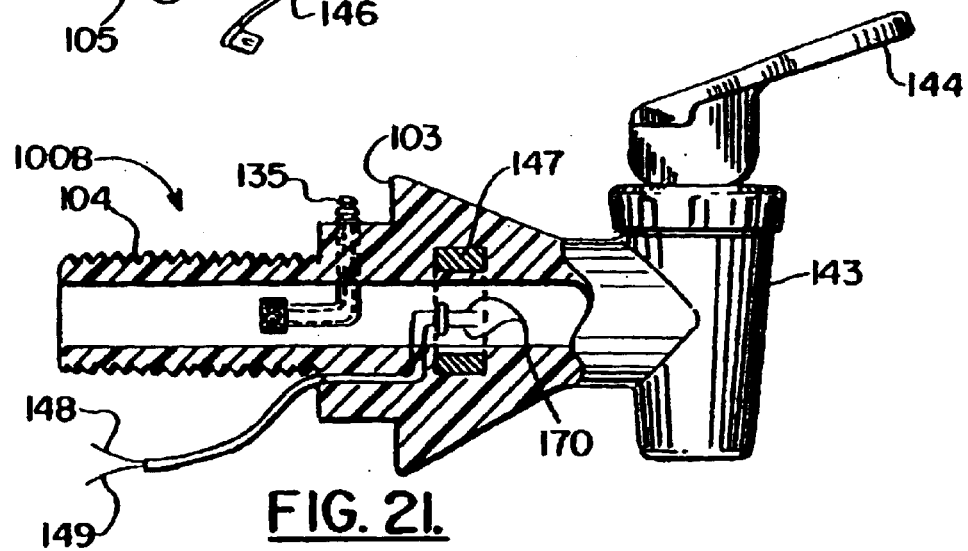
FIG. 21 is a partially cut away elevation view showing an alternate construction for the spigot that is a part of the alternate embodiment of the apparatus of the present invention.
Figure 22:
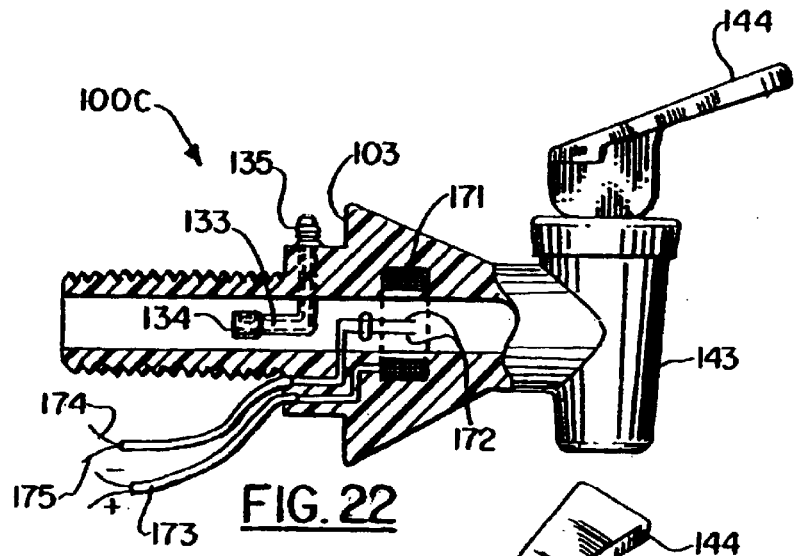
FIG. 22 is a partially cut away elevation view showing alternate construction for the spigot that is a part of the alternate embodiment of the apparatus of the present invention.
Figure 23:
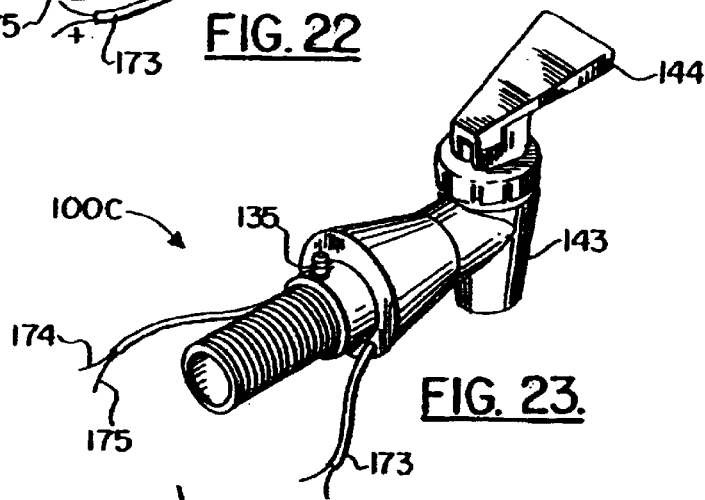
FIG. 23 is a partial perspective view showing the spigot of FIG. 22.
Figure 24:
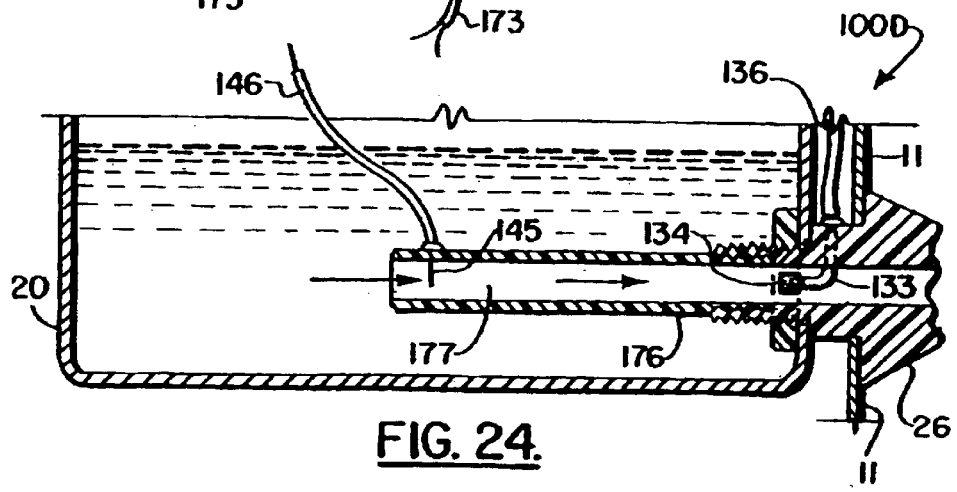
FIG. 24 is a partial sectional, elevation view of the alternate embodiment of the apparatus of the present invention showing an alternate spigot construction.
Figure 25:
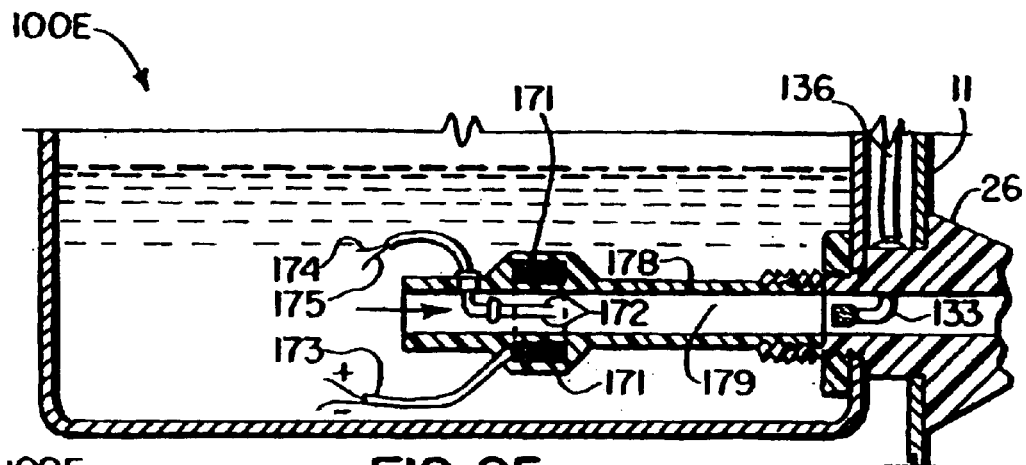
FIG. 25 is a partial sectional, alternate spigot construction elevation view of the alternate embodiment of the apparatus of the present invention showing an alternate spigot construction.
Figure 26:
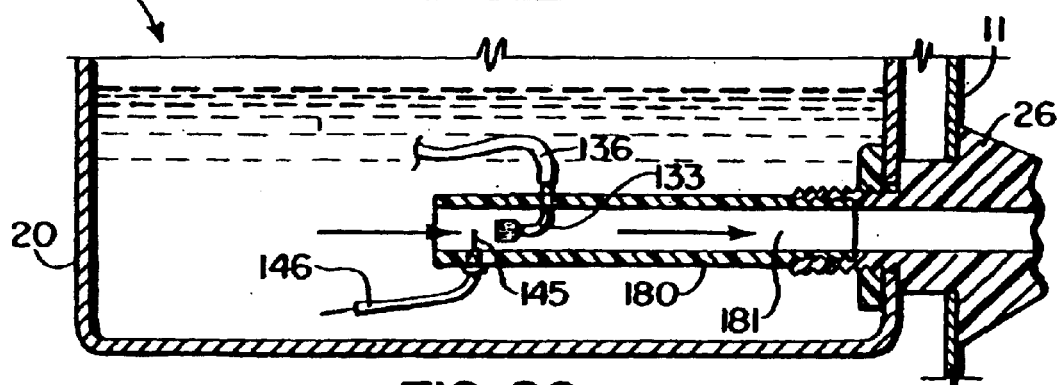
FIG. 26 is a partial sectional, elevation view of the alternate embodiment of the apparatus of the present invention showing an alternate spigot construction.
Figure 27:
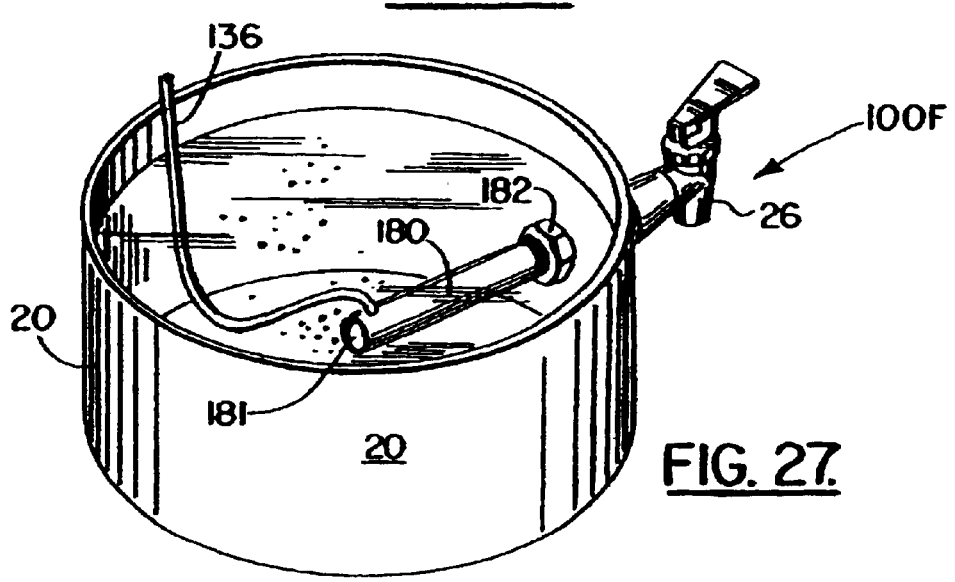
FIG. 27 is a partial perspective view of the alternate embodiment of the apparatus of the present invention.

In FIGS. 19–27, alternate constructions for the spigot are disclosed, designated by the numeral 100A in FIGS. 19–20; 100B in FIG. 21; 100C in FIGS. 22–23; 100D in FIG. 24; 100E in FIG. 25; and 100F in FIGS. 26–27. Spigot 100A in FIGS. 19–20 is similar to a commercially available spigot such as spigot 26 or 27. In FIG. 19, spigot 100A has a body 143, handle 144 and a flow sensor 145 that activates the ozone generator and air pump responsive to water flow that is sensed by flow sensor 145. Water flow is sensed by flow sensor 145 when spigot 100A is opened by depression of valve handle 144 and water flows in channel 105. Instrumentation line 146 activates the ozone generator and blower when valve handle 144 is depressed and flow is sensed. A flow sensor 145 and its instrumentation line 146 are commercially available. Such a sensor 145 and instrumentation 146 can be used to activate the blower and ozone generator of FIGS. 1–14.

In FIG. 21, spigot 100B has magnetic flow sensor with magnet 147 and sensors 170. In FIGS. 22, 23 spigot 100C provides a flow meter that can be an electromagnet type flow sensor with instrumentation lines 148, 149. In FIG. 22, an electrical supply 173 powers electromagnet 171 with flow sensors 172. Such an electromagnet flow sensor 171, 172 is available commercially. Instrumentation lines 174, 175 enable the flow sensor 171, 172 to operate the ozone generator and blower of FIGS. 1–14.

In FIGS. 24–27 a spigot 100D can include a conventional spigot body 26 provided with an extension tube. In FIG. 24, flow sensor 145 is mounted to extension tube 176 having flow bore 177. The extension tube 177 can be glued or threadably connected to a standard, commercially available spigot 26 or 27. Flow line 136 carrying ozone from the ozone generator of FIGS. 1–14 communicates with fitting 133 mounted directly to the conventional spigot 26. Diffuser 134 dispenses ozone to bore 177 upstream of spigot 26. The spigot apparatus 100D of FIG. 24 is use to activate the ozone generator and blower of FIGS. 1–14 when flow is sensed by flow sensor 145 and instrumentation line 146.

The spigot 100E of FIG. 25 includes extension tube 178 with bore 179. Electromagnet flow sensor 172 having electromagnet 171 powered by electricity via line 173 is mounted to tube 179. Sensor 172 communicates with and activates the ozone generator and blower of FIGS. 1–14 via instrumentation lines 174, 175. The tube 178 having bore 179 can be glued or threadably attached to a standard spigot 26 (see FIG. 25).

In FIGS. 26, 27 Spigot 100F has tube 180 with bore 181. Both flow sensor 145 and diffuser 134 with fitting 133 are mounted to tube 180. Tube 180 can be glued, threadably attached or otherwise connected to spigot 26. Nut 182 can secure spigot 100F to cabinet 111 and reservoir 20.

Figure 28:
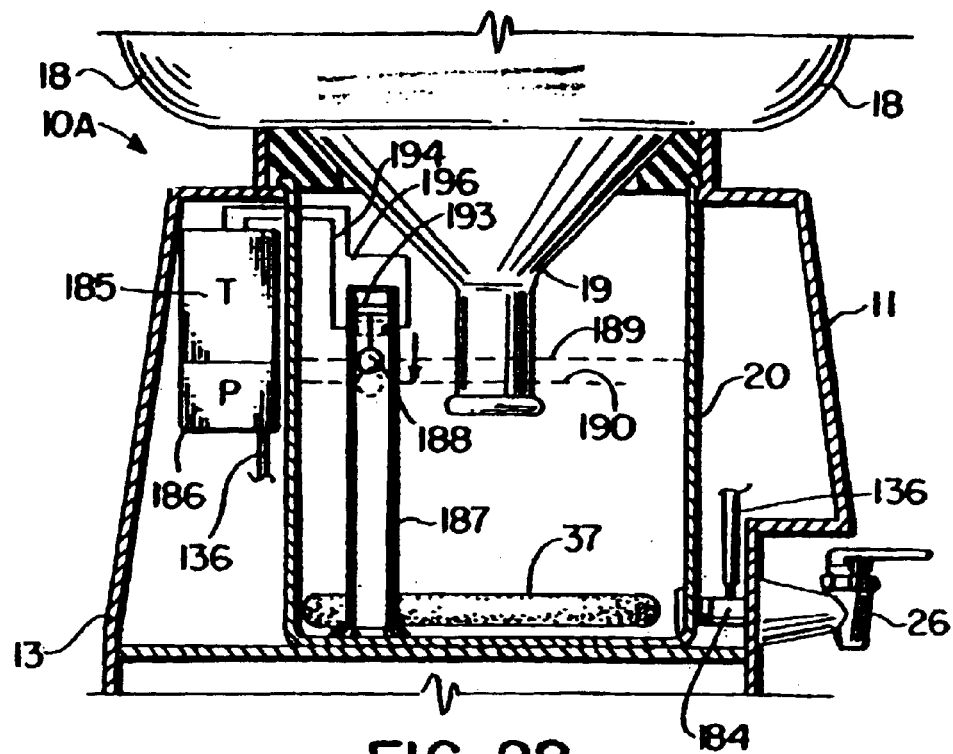
FIG. 28 is a sectional elevation view of the alternate embodiment of the apparatus of the present invention.

FIG. 28 is a sectional, elevation view of an alternate embodiment of the apparatus of the present invention, designated generally by the numeral 10A. In FIG. 10A, ozone is generated for sanitation of water responsive to operation of the spigot. In FIG. 10A, the ozone generator is not shown but is connected to pump P 186 that is activated using timer 185. The ozone generator of the preferred embodiment of FIGS. 1–14 could be used in combination with FIG. 28, generating ozone that is pumped using pump 186 and transmitting that ozone to diffuser 37 via flow line 136. Flow line 136 can also be transmitted to an extension tube 184 that is connected to a conventional spigot 26. As shown in FIG. 28, the extension tube 28 can extend between spigot 26 and reservoir 20. In FIG. 28, an inverted bottle type water cooler is shown having a cabinet 11 with an opening at the top as shown and described with the previous drawings of FIGS. 1–14. An inverted bottle 18 has a neck 19 that extends into reservoir 20. When the spigot 26 is activated to dispense water, the water level drops from a first water level 89 to a lower water level 90. This causes the float 188 to drop and wherein the contact 193 on the float 188 closes a circuit with the two electrical lines 194, 196. When this occurs, the timer activates the pump 186 and ozone generator for pumping ozone to either or both of diffuser 137 and extension 184. Thus, ozone is generated responsive to inactivation of the spigot 26 by a user that depresses the handle part of the spigot.

Figure 29:
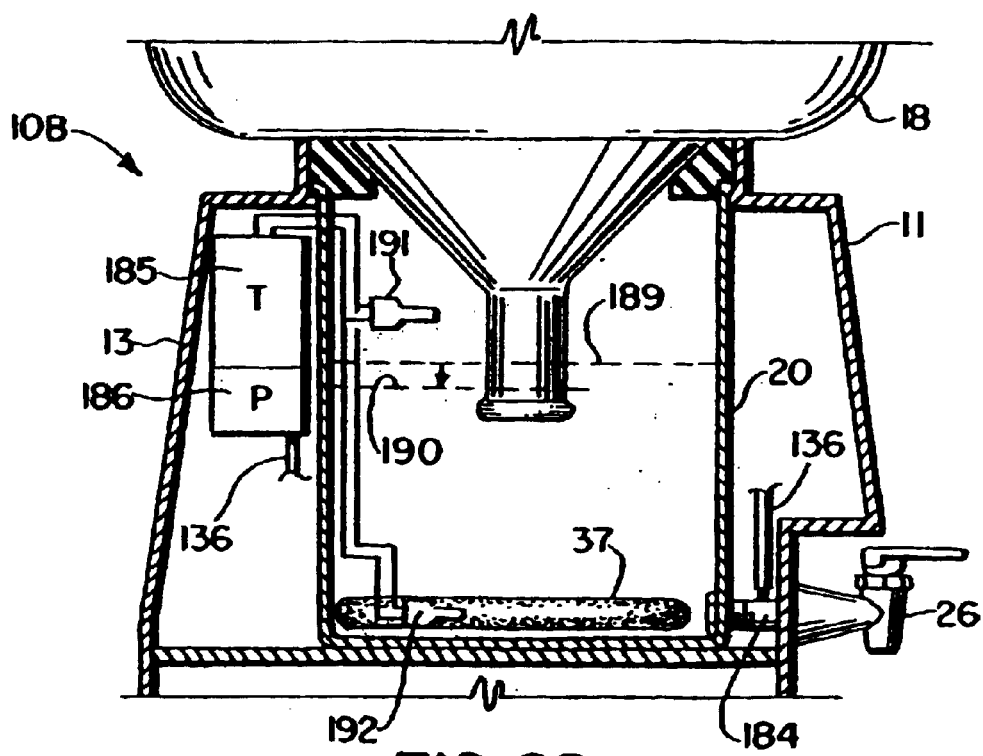
FIG. 29 is another sectional elevation view of the alternate embodiment of the apparatus of the present invention used in combination with an air pressure switch.

In FIG. 29, an additional embodiment is designated by the numeral 10B. In FIG. 29, the upper end 13 of cabinet 11 is provided with a timer 185 and pump 186. The pump 186 pumps ozone that has been generated using an ozone generator as shown and described in FIGS. 1–14 or in FIGS. 30–34, 36. In FIG. 29, pressure controllers 191, 192 are provided. As the water level drops from level 189 to level 190, either one or both of the sensors 191, 192 can be used to monitor the change in pressure for activating the timer 185 and pump 186 via instrumentation lines 197, 198. As with the embodiment of FIG. 28, the water level drops from level 189 to level 190 when the spigot 26 is operated by depressing the handle. Thus, ozone is generated to reservoir 20 using diffuser 37 and/or to extension 184 using flow line 136. In this fashion, ozone is generated responsive to activation of the spigot 26.

Figure 30:
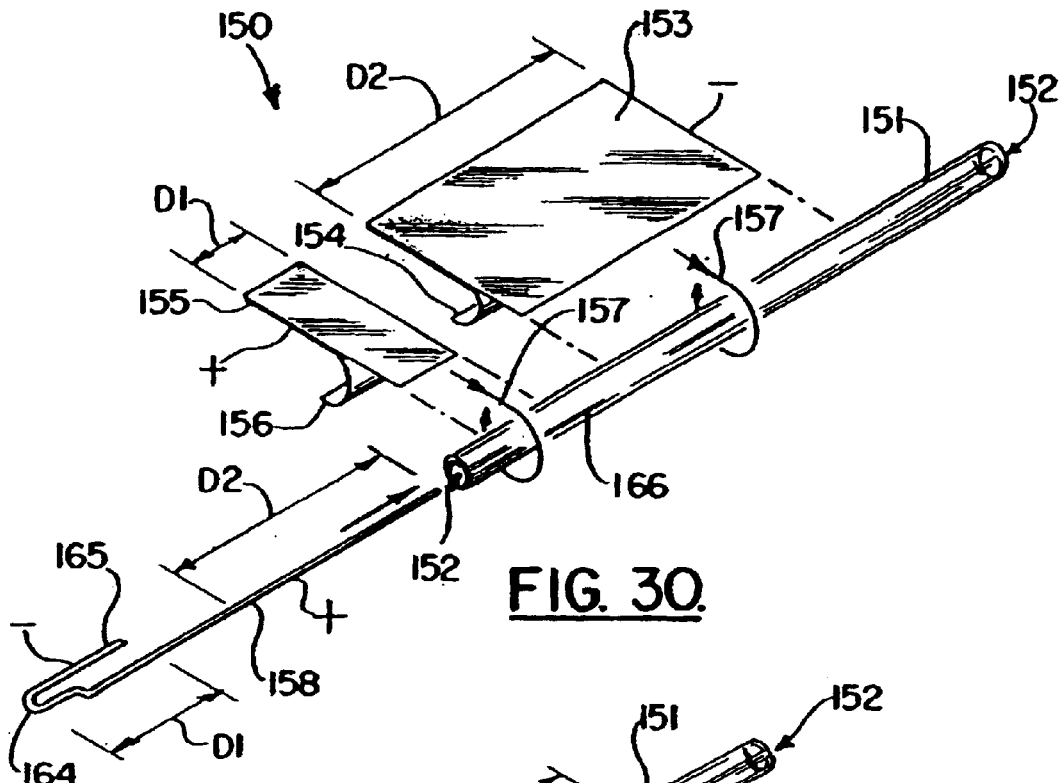
FIG. 30 is a perspective use of an alternate ozone generator instruction that can be used with any of the embodiments of FIGS. 1–29.

FIGS. 30–35 show an alternate embodiment of the apparatus of the present invention, designated generally by the numeral 150 in FIGS. 30, 31, 32, 33, 35. The ozone generator or ozone discharge tube 150 of FIGS. 30–35 features a dielectric tubing 151 that can be, for example, a Corning® or Pyrex® cylindrically shaped glass tube having a central longitudinal bore 152. A pair of foil adhesive layers are applied to the external surface 166 of the tube 151. These layers include foil adhesive tape layer 153 and foil adhesive layer 155. Each of these layers can be in the form of adhesive tape having release liners. In FIG. 30, the foil adhesive tape section 153 has release liner 154. The smaller foil adhesive tape section 155 has release liner 156.

Figure 31:
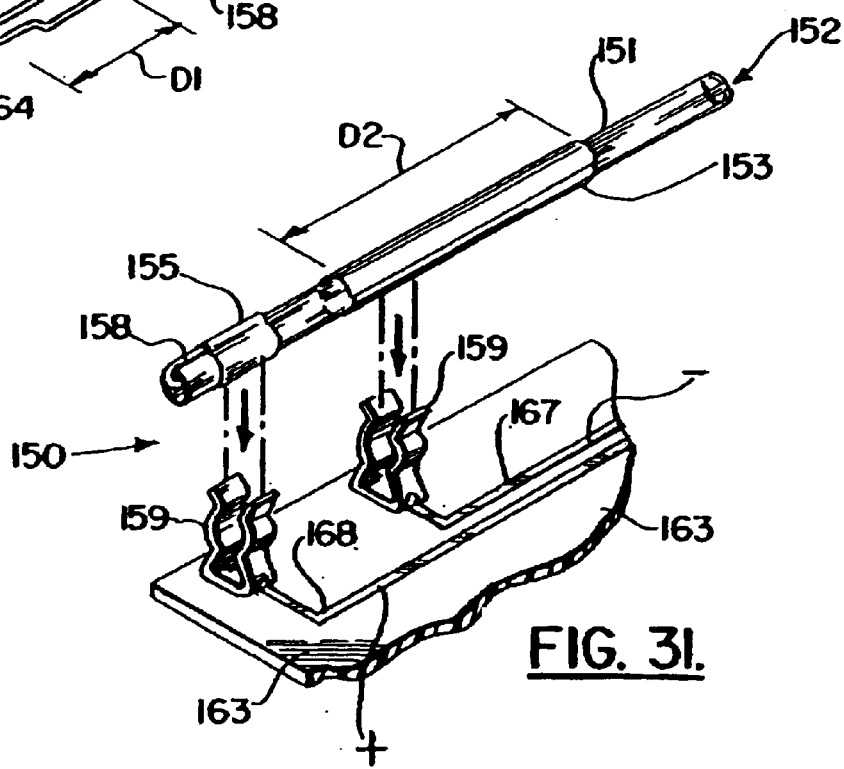
FIG. 31 is a partial perspective view of the ozone generator of FIG. 30.

Arrows 157 in FIG. 30 schematically illustrate the application of each of the foil adhesive tape sections 153, 155 to the external surface of tubing 151. Electrode 158 is placed inside of tubing 151, occupying a part of bore 152. One end portion of electrode 158 provides a clamp 164 that attaches to an end of tubing 151. An exposed portion 165 of electrode 158 is placed on the outer surface 156 of tubing 151. The foil adhesive tape section 153 is preferably of a size and shape that enables it to communicate with and cover the exposed part 165 as shown in FIGS. 30 and 31.

In FIG. 30, the exposed part 165 and foil adhesive tap section 155 are each of a width "D1" as shown. The foil adhesive tape section 153 is spaced from the foil adhesive tape section 155 and is of a size and shape to encircle the tubing 151 and to extend a length along the tubing 151 as seen in FIG. 1 that is partially filled with electrode 158. Arrows "D2" in FIGS. 30–31 show the width of sheet 153 and the part of electrode 158 that aligns with sheet 153 after placement of electrode 158 in bore 152 of tube 151. A pair of metallic spring clips 159 communicate with electrical leads 167, 168 that are mounted upon circuit board 169. In this fashion, the circuit board can provide a timing circuitry that is in electrical communication with an ozone power circuit and air blower (pump) for operating discharge tube 150 via clamps 159 and leads 168. A simple timing circuit activates the ozone generator 150 pump or air blower for a selected time interval. At about the same time, the blower 169 can be activated by the timing circuit. The timing circuit shuts off generator 150 and blower 169 after they operate for a desired time interval.

Figure 32:
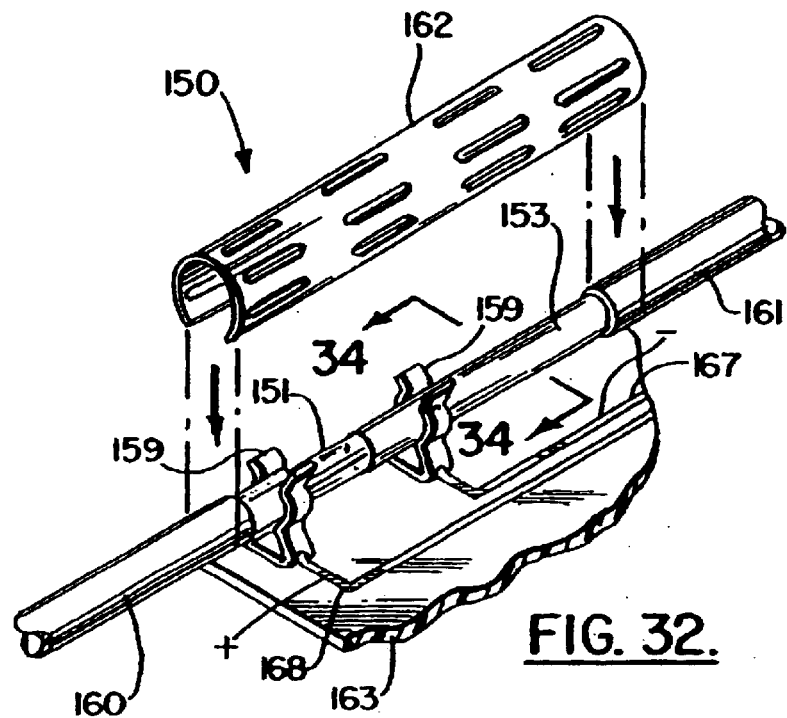
FIG. 32 is a perspective view of the ozone generator of FIGS. 30–35.
Figure 33:
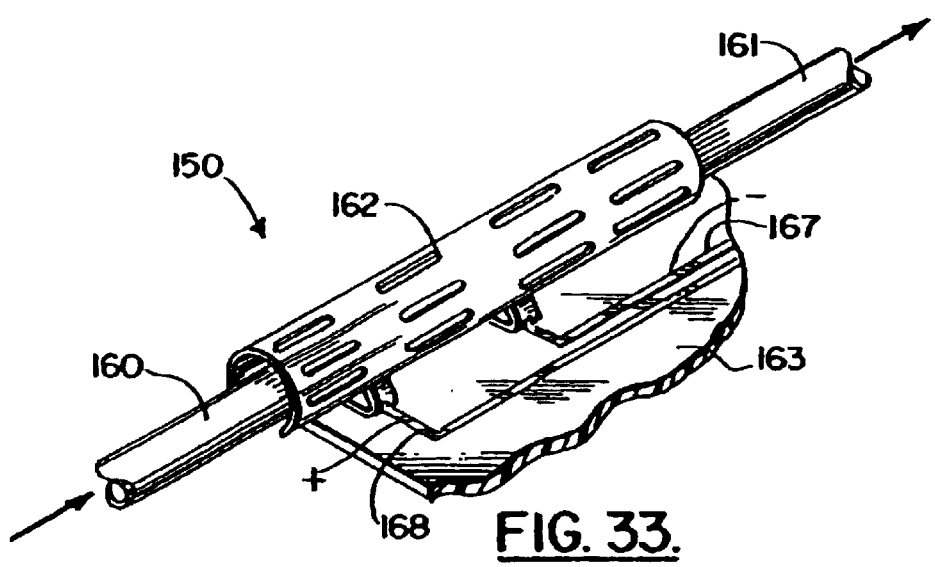
FIG. 33 is a perspective view of the ozone generator of FIGS. 30–32.
Figure 34:
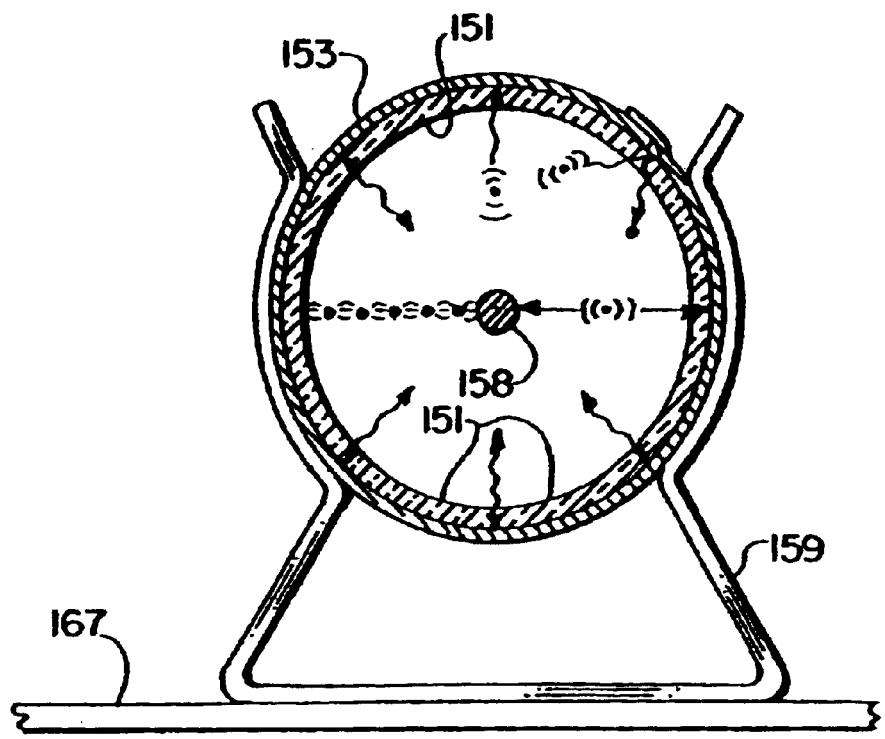
FIG. 34 is a sectional view taken along lines 34—34 of FIG. 32.
Figure 35:
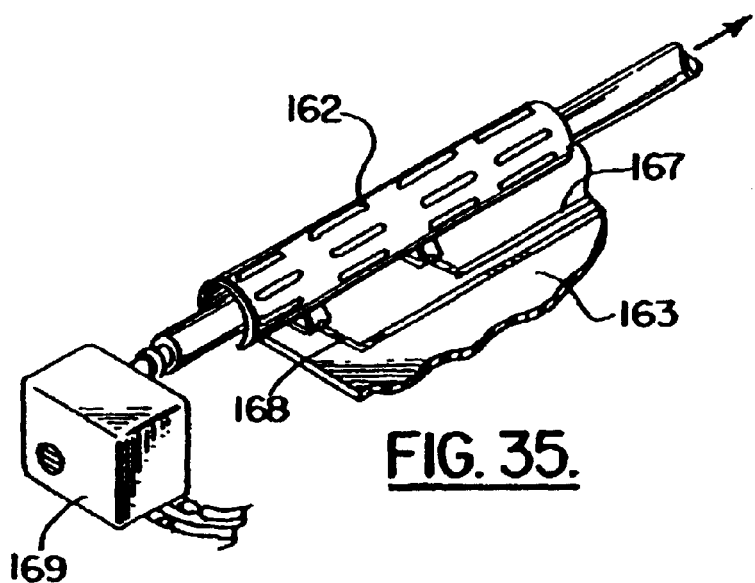
FIG. 35 is a perspective view of the improved ozone generator of FIGS. 30–34.

A flow conduit 160 is attached to an end portion of tubing 151 as shown in FIG. 32. Similarly, a discharge conduit 161 is mounted to an end portion of tubing 151 that is opposite the conduit 160. Upon assembly, the glass tubing 151 can be covered and protected by safety cover 162. An air pump 169 can be connected to the conduit 160 for driving air through the bore 152 of tubing 151. In FIG. 34, the negatively polarity (−) foil 153 acts as a reflector tube to concentrate far UV ozone at the central longitudinal axis of tubing 151 and next to electrode 158, thus increasing output. This differs from prior art arrangements wherein far UV is not reflected and concentrated but dissipates. The ozone generator 150 can be used in place of ozone generator 50 of any embodiment of FIGS. 1–16 or as the ozone generator for the embodiments shown in FIGS. 17–29.

In FIG. 34, the (−) polarity foil electrode reflector tube acts as a cylindrical mirror for concentrating oxygen cleaving range far UV at the central longitudinal axis of tubing 151 at the (+) polarity electrode 158. Far UV, being above the primary heat producing range does not contribute significantly to process air heating. The bulk of the dielectric resistance heating is absorbed by the low mass-high surface area thin radiator material (−) polarity external foil electrode and radially transferred to ambient air outside the tube. By this process, the ozone discharge tube runs cool and does not contribute to ozone degradation. This differs from some prior art arrangements of wherein far UV ionizing radiation is not reflected and concentrated by dissipates.

The following table lists the parts numbers and parts descriptions as used herein and in the drawings attached hereto.

PARTS LIST

| Part Number | Description |
| --- | --- |
| 10 | water dispenser |
| 10A | water dispenser |
| 10B | water dispenser |
| 10C | water dispenser |
| 11 | cabinet |
| 12 | lower end |
| 13 | upper end |
| 14 | cover |
| 15 | annular flange |
| 16 | gasket |
| 17 | opening |
| 18 | bottle |
| 19 | bottle neck |
| 20 | reservoir |
| 21 | interior |
| 22 | reservoir side wall |
| 23 | reservoir bottom wall |
| 24 | open top |
| 25 | water surface |
| 26 | spigot |
| 27 | spigot |
| 28 | refrigeration coil |
| 29 | compressor |
| 30 | flow line |
| 31 | flow line |
| 32 | heat exchanger |
| 33 | electrical line |
| 34 | plug |
| 35 | flow line |
| 36 | outlet port |
| 37 | diffuser |
| 37A | diffuser |
| 38 | air line |
| 39 | fitting |
| 40 | housing |
| 41 | electrical line |
| 42 | controller |
| 43 | plug |
| 44 | receptacle |
| 45 | flange |
| 46 | opening |
| 47 | lower end |
| 48 | upper end |
| 49 | opening |
| 50 | ozone generator |
| 51 | transformer |
| 52 | electrical line |
| 53 | motor |
| 54 | blower |
| 55 | air line |
| 56 | air inlet |
| 57 | ozone generator housing |
| 58 | lower housing section |
| 59 | upper housing section |
| 60 | flange |
| 61 | flange |
| 62 | gasket |
| 63 | bolted connection |
| 64 | internally threaded opening |
| 65 | arrow |
| 66 | arrow |
| 67 | bubble |
| 68 | foot |
| 69 | opening |
| 70 | angle |
| 71 | filter |
| 72 | porous body |
| 73 | inner surface |
| 74 | outer surface |
| 75 | hollow bore |
| 76 | non-porous coating |
| 77 | end portion |
| 78 | end portion |
| 79 | elbow fitting |
| 80 | body |
| 81 | leg |
| 82 | leg |
| 83 | coupling material |
| 84 | bore |
| 85 | bore |
| 86 | external threads |
| 87 | stab fitting |
| 88 | grinding tool |
| 89 | shaft |
| 90 | exposed face |
| 91 | arrow |
| 92 | bubble |
| 100 | spigot |
| 100A | spigot |
| 100B | spigot |
| 100C | spigot |
| 100D | spigot |
| 100E | spigot |
| 100F | spigot |
| 101 | spigot housing |
| 102 | handle |
| 103 | annular flange |
| 104 | threads |
| 105 | horizontal bore |
| 106 | vertical bore |
| 107 | flow outlet |
| 108 | valve body |
| 109 | annular shoulder |
| 110 | operating rod socket |
| 111 | operating rod |
| 112 | return spring |
| 113 | socket |
| 114 | cap |
| 115 | internal threads |
| 116 | external threads |
| 117 | retainer |
| 118 | annular flange |
| 119 | annular flange |
| 120 | annular groove |
| 121 | transverse opening |
| 122 | transverse opening |
| 123 | pin |
| 124 | cam surface |
| 125 | collar |
| 126 | central opening |
| 127 | dual contact barrel |
| 128 | receptacle |
| 129 | plug |
| 130 | electrical line |

-continued

PARTS LIST

| Part Number | Description |
| --- | --- |
| 131 | electrical line |
| 132 | waterproof seal |
| 133 | ozone supply fitting |
| 134 | diffuser |
| 135 | barb connector |
| 136 | flow tube |
| 137 | flow bore |
| 138 | electrical lead |
| 139 | electrical lead |
| 140 | passageway |
| 141 | user |
| 142 | arrow |
| 143 | spigot body |
| 144 | valve handle |
| 145 | flow sensor |
| 146 | instrumentation line |
| 147 | magnetic flow sensor |
| 148 | electrical line |
| 149 | electrical line |
| 150 | ozone discharge tube |
| 151 | dielectric tubing |
| 152 | longitudinal bore |
| 153 | foil adhesive tape section |
| 154 | release liner |
| 155 | foil adhesive tape section |
| 156 | release liner |
| 157 | arrow |
| 158 | electrode |
| 159 | spring clip |
| 160 | conduit |
| 161 | conduit |
| 162 | safety cover |
| 163 | circuit board |
| 164 | clamp |
| 165 | exposed part |
| 166 | outer surface |
| 167 | lead |
| 168 | lead |
| 169 | blower |
| 170 | flow sensor |
| 171 | electromagnet |
| 172 | flow sensor |
| 173 | electrical supply line |
| 174 | instrumentation line |
| 175 | instrumentation line |
| 176 | extension tube |
| 177 | flow bore |
| 178 | extension tube |
| 179 | flow bore |
| 180 | extension tube |
| 181 | flow bore |
| 182 | nut |
| 183 | external thread |
| 184 | extension tube |
| 185 | timer |
| 186 | pump |
| 187 | float valve controller |
| 188 | float |
| 189 | water level |
| 190 | water level |
| 191 | air pressure controller |
| 192 | fluid pressure controller |
| 193 | contact |
| 194 | electrical line |
| 195 | arrow |
| 196 | electrical line |
| 197 | instrumentation line |
| 198 | instrumentation line |

The foregoing embodiments are presented by way of example only; the scope of the present invention is to be limited only by the following claims.

What is claimed is:

1. A water dispenser, comprising:
a) a cabinet having upper and lower end portions and an interior;
b) the upper end portion of the cabinet having a cover with an opening for receiving and holding a bottle of water to be dispensed;
c) reservoir contained within the cabinet, the reservoir containing water with a water surface;
d) one or more spigots in fluid communication with the reservoir for dispensing water, each spigot having a manually operable valve handle that opens the spigot to dispense water from the spigot;
e) a refrigeration system for cooling water within the reservoir;
f) a diffuser for emitting bubbles into the reservoir, said diffuser being a porous body having pores and contained within the reservoir that generates bubbles of a size that is defined by the size of the pores;
g) an ozone generator housing supported next to the cabinet, said housing having an ozone generator inside the housing and air flow lines for transmitting air to and from the housing interior; and
h) a timer that activates the ozone generator for a selected time interval.

2. The water dispenser of claim 1 wherein the reservoir includes a generally vertical sidewall and the diffuser is a ring positioned to discharge bubbles against the sidewall so that the sidewall is scrubbed with ozone bubbles during use.

3. The water dispenser of claim 1 wherein the ozone generator generates sufficient ozone bubbles to sterilize the water in the reservoir by bubbling air upwardly a distance of just a few inches.

4. The water dispenser of claim 3 wherein bubbles rise upwardly a distance of between about two and ten inches.

5. The water dispenser of claim 3 wherein bubbles rise upwardly a distance of between about four and eight inches.

6. The water dispenser of claim 1 further comprising means for enabling the ozone generator to continue to generate air flow into said ozone generator housing and air diffuser via first and second air flow lines for selected time after the ozone generator has been deactivated.

7. The water dispenser of claim 1 further comprising a transformer for generating high voltage electricity for the ozone generator.

8. The water dispenser of claim 1 wherein the opening is a water inlet opening and defines a replenishing means that includes a central water inlet and a diffuser ring spaced horizontally away from the water inlet.

9. A cooled water dispenser, comprising:
a) a cabinet having a contained water dispensing system that includes a water source, a reservoir a porous diffuser having pores for emitting ozone bubbles, and a dispensing spigot;
b) a refrigeration system for cooling water contained in the water dispensing system;
c) an ozone generator housing supported by the cabinet, said housing having an ozone generator inside the housing and air flow lines for transmitting air to and from the housing interior;
d) a blower for generating air flow;
e) a first air flow line connecting the blower and the housing interior;
f) a second air flow line connecting the housing interior with the porous diffuser; and g) means for adding ozone to the water dispensing system when the spigot is operated, said means including the ozone generator, blower, porous diffuser, and flow lines;

h) wherein the diffuser generates bubbles of a size that is defined by the size of the pores of the diffuser.

10. The water dispenser of claim 9 wherein the diffuser is a ring positioned around the side of the reservoir at the bottom of the reservoir.

11. The water dispenser of claim 10 wherein the diffuser ring is generally circular.

12. The water dispenser of claim 10 wherein the reservoir has a center portion and the diffuser ring has openings positioned to direct air emissions from the center portion of the reservoir.

13. The water dispenser of claim 10 wherein the reservoir includes a generally vertical sidewall and the diffuser ring is positioned to discharge bubbles against the sidewall so that the sidewall is scrubbed with ozone bubbles during use.

14. The water dispenser of claim 9 wherein the ozone generator generates sufficient ozone bubbles to sterilize the water in the reservoir by bubbling air upwardly a distance of just a few inches.

15. The water dispenser of claim 9 further comprising means for enabling the ozone generator to continue to generate air flow into said ozone generator housing and air diffuser via first and second air flow lines for selected time after the ozone generator has been deactivated.

16. The water dispenser of claim 9 further comprising a transformer for generating high voltage electricity for the ozone generator.

17. The water dispenser of claim 9 further comprising a replenishing means that includes a central water inlet and the diffuser ring is spaced horizontally away from the water inlet.

18. A water dispenser, comprising:
a) a cabinet having upper and lower end portions and an interior;
b) the upper end portion of the cabinet having a cover with an opening for receiving and holding a bottle of water to be dispensed;
c) reservoir contained within the cabinet, the reservoir containing water with a water surface;
d) one or more spigots in fluid communication with the reservoir for dispensing water, each spigot having a manually operable valve handle that opens the spigot to dispense water from the spigot;
e) a diffuser for emitting bubbles into the reservoir, said diffuser being a porous body contained within the reservoir;
f) an ozone generator housing supported next to the housing, said housing having an ozone generator inside the housing and air flow lines for transmitting air to and from the housing interior; and
g) a timer that activates the ozone generator for a selected time interval and then deactivates the ozone generator after the selected time interval expires.

19. The water dispenser of claim 18 wherein the reservoir includes a generally vertical sidewall and the diffuser ring is positioned to discharge bubbles against the sidewall so that the sidewall is scrubbed with ozone bubbles during use.

20. The water dispenser of claim 18 wherein the ozone generator generates sufficient ozone to sterilize the water in the reservoir by bubbling air upwardly a distance of just a few inches.

21. The water dispenser of claim 20 wherein bubbles rise upwardly a distance of between about two and ten inches.

22. The water dispenser of claim 20 wherein bubbles rise upwardly a distance of between about two and ten inches.

23. The water dispenser of claim 18 wherein the ozone generator to continue to generate air flow into said ozone generator housing and air diffuser via first and second air flow lines for selected time after the ozone generator has be deactivated.

24. The water dispenser of claim 18 further comprising a transformer for generating high voltage electricity for the ozone generator.

25. The water dispenser of claim 18 wherein the replenishing means includes a central water inlet and a diffuser ring is spaced horizontally away from the water inlet.

26. A water dispenser, comprising:
a) a cabinet having upper and lower end portions and an interior;
b) the cabinet having an inlet opening for receiving water from a water source;
c) a reservoir contained within the cabinet, the reservoir containing water with a water surface and receiving water via the inlet opening from the water source;
d) one or more spigots in fluid communication with the reservoir for dispensing water, each spigot having a manually operable valve handle that opens the spigot to dispense water from the spigot;
e) a refrigeration system for cooling water within the reservoir;
f) a diffuser for emitting bubbles into the reservoir, said diffuser being a porous body having pores and contained within the reservoir that generates bubbles of a size that is defined by the size of the pores;
g) an ozone generator housing supported next to the cabinet, said housing having an ozone generator inside the housing and air flow lines for transmitting air to and from the housing interior; and
h) a timer that activates the ozone generator for a selected time interval.

27. The water dispenser of claim 26 wherein the ozone generator generates sufficient ozone bubbles to sterilize the water in the reservoir by bubbling air upwardly a distance of just a few inches.

28. The water dispenser of claim 26 wherein the diffuser is a ring positioned around the side of the reservoir at the bottom of the reservoir.

29. The water dispenser of claim 26 further comprising a transformer for generating high voltage electricity for the ozone generator.

30. The water dispenser of claim 26 wherein bubbles rise upwardly a distance of between about two and ten inches.

31. The water dispenser of claim 26 wherein bubbles rise upwardly a distance of between about four and eight inches.

32. A water dispenser, comprising:
a) a cabinet having upper and lower end portions and an interior;
b) the cabinet having an inlet opening for receiving water from a water source;
c) a reservoir contained within the cabinet, the reservoir containing water with a water surface and receiving water via the inlet opening from the water source;
d) one or more spigots in fluid communication with the reservoir for dispensing water, each spigot having a manually operable valve handle that opens the spigot to dispense water from the spigot;
e) a diffuser for emitting bubbles into the reservoir, said diffuser being a porous body contained within the reservoir;

f) an ozone generator housing supported next to the housing, said housing having an ozone generator inside the housing and air flow lines for transmitting air to and from the housing interior; and g) a timer that activates the ozone generator for a selected time interval and then deactivates the ozone generator after the selected time interval expires.

33. The water dispenser of claim 32 wherein the ozone generator generates sufficient ozone to sterilize the water in the reservoir by bubbling air upwardly a distance of just a few inches.

34. The water dispenser of claim 32 further comprising means for enabling the ozone generator to continue to generate air flow into said ozone generator housing and air diffuser via first and second air flow lines for selected time after the ozone generator has been deactivated.

35. The water dispenser of claim 32 further comprisig a transformer for generating high voltage electricity for the ozone generator.

36. The water dispenser of claim 32 wherein bubbles rise upwardly a distance of between about two and ten inches.

37. The water dispenser of claim 32 wherein bubbles rise upwardly a distance of between about four and eight inches.

\* \* \* \* \*